(12) United States Patent
Tang et al.

(10) Patent No.: US 12,242,044 B2
(45) Date of Patent: Mar. 4, 2025

(54) ZOOM LENS ASSEMBLY

(71) Applicant: ZHEJIANG SUNNY OPTICS CO., LTD., Zhejiang (CN)

(72) Inventors: Mengna Tang, Zhejiang (CN); Jianke Wenren, Zhejiang (CN); Fujian Dai, Zhejiang (CN); Liefeng Zhao, Zhejiang (CN)

(73) Assignee: Zhejiang Sunny Optics Co., Ltd., Ningbo (CN)

(*) Notice: Subject to any disclaimer, the term of this patent is extended or adjusted under 35 U.S.C. 154(b) by 0 days.

(21) Appl. No.: 17/546,073

(22) Filed: Dec. 9, 2021

(65) Prior Publication Data

US 2022/0187580 A1    Jun. 16, 2022

(30) Foreign Application Priority Data

Dec. 11, 2020   (CN) .......................... 202011453504.0

(51) Int. Cl.
   *G02B 15/14*    (2006.01)
(52) U.S. Cl.
   CPC .................... *G02B 15/143* (2019.08)
(58) Field of Classification Search
   CPC .......... G02B 15/143503; G02B 15/143; G02B 15/24; G02B 15/14; G02B 15/167
   USPC .................. 359/689, 735, 739, 676
   See application file for complete search history.

(56) References Cited

U.S. PATENT DOCUMENTS

| 4,844,599 A | 7/1989 | Ito | |
| 5,216,547 A * | 6/1993 | Ogata | G02B 15/143103 359/713 |
| 11,644,651 B2 * | 5/2023 | Wang | G02B 13/0045 359/686 |
| 2004/0136089 A1 * | 7/2004 | Takahashi | G02B 15/143103 359/689 |

(Continued)

FOREIGN PATENT DOCUMENTS

| CN | 1580855 A | 2/2005 |
| CN | 204188870 U | 3/2015 |

(Continued)

OTHER PUBLICATIONS

The first office action of counterpart CN application No. 202011453504.0 was issued on Sep. 25, 2024.

*Primary Examiner* — Thomas K Pham
*Assistant Examiner* — Kuei-Jen L Edenfield
(74) *Attorney, Agent, or Firm* — Grogan, Tuccillo & Vanderleeden, LLP

(57) ABSTRACT

The disclosure provides a zoom lens assembly, which sequentially comprises, from an object side to an image side along an optical axis thereof: a first lens group; a second lens group with a positive refractive power; and a third lens group with a negative refractive power. The second lens group and the third lens group move along the optical axis to implement continuous zooming. The zoom lens assembly has a wide-angle end position, a middle end position and a telephoto end position. EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, EPD and ImgH and DTmax satisfy: EPD*ImgH/DTmax>6.5 mm.

13 Claims, 24 Drawing Sheets

(56) References Cited

U.S. PATENT DOCUMENTS

| | | | | |
|---|---|---|---|---|
| 2013/0342749 | A1* | 12/2013 | Tashiro | G02B 13/009 |
| | | | | 359/689 |
| 2017/0184828 | A1* | 6/2017 | Machida | G02B 15/16 |
| 2019/0086638 | A1* | 3/2019 | Lee | G02B 9/60 |
| 2022/0413269 | A1* | 12/2022 | Yao | G02B 15/15 |

FOREIGN PATENT DOCUMENTS

| | | |
|---|---|---|
| CN | 214669842 U | 11/2021 |
| JP | 2009025534 A | 2/2009 |

\* cited by examiner wide-angle end middle end wide-angle end middle end wide-angle end middle end wide-angle end middle end

ZOOM LENS ASSEMBLY

CROSS-REFERENCE TO RELATED APPLICATION(S)

The disclosure claims priority to and the benefit of Chinese Patent Application No. 202011453504.0, filed in the China National Intellectual Property Administration (CNIPA) on 11 Dec. 2020, which is incorporated herein by reference in its entirety.

TECHNICAL FIELD

The disclosure relates to the technical field of optical imaging devices, and particularly to a zoom lens assembly.

BACKGROUND

With the constant development of smart phones, camera mode has become one of main highlights when new mobile phones are launched every year, and thus the development of camera modes has become the top priority of each major mobile phone manufacturer. Ultra-wide angle, large focal length, large aperture, large image surface and the like gradually become standard camera configurations of mobile phones. A zoom lens assembly changes a distance between each lens group of the lens assembly to change the focal length. The zoom lens assembly technology has yet not been applied to mobile phones maturely. Compared with digital zooming, optical zooming may support the addition of more pixels after the imaging of an image subject to constantly magnify the subject and simultaneously achieve a higher definition without changing the resolution and the image quality. Digital zooming achieves a magnification effect through a cropping chip, which results in the serious sacrifice of the image quality.

That is, a zoom lens assembly in a prior art has the problem of low imaging quality.

SUMMARY

Some embodiments of the disclosure provide a zoom lens assembly, to solve the problem of low imaging quality of a zoom lens assembly in the prior art.

In order to achieve the above purpose, according to an aspect of the disclosure, a zoom lens assembly is provided, which sequentially includes, from an object side to an image side along an optical axis thereof: a first lens group, multiple lenses in the first lens group being spaced; a second lens group with a positive refractive power, multiple lenses in the second lens group being spaced; and a third lens group with a negative refractive power, multiple lenses in the third lens group being spaced. The second lens group and the third lens group move along the optical axis to implement continuous zooming. The zoom lens assembly has a wide-angle end position, a middle end position and a telephoto end position. EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, EPD and ImgH and DTmax satisfy: EPD*ImgH/DTmax>6.5 mm.

In an implementation mode, an effective focal length fw of the zoom lens assembly at the wide-angle end position and an effective focal length fG1 of the first lens group satisfy: $-0.5 <$ fw/fG1$<0$.

In an implementation mode, an effective focal length fw of the zoom lens assembly at the wide-angle end position and an effective focal length fG3 of the third lens group satisfy: $-1.5<$ fw/fG3$\leq-1.0$.

In an implementation mode, an effective focal length fG2 of the second lens group and an effective focal length fG3 of the third lens group satisfy: $-1.5<$ fG3/fG2$<-1.0$.

In an implementation mode, a center thickness D1 of the first lens group, a center thickness D2 of the second lens group and a center thickness D3 of the third lens group satisfy: $0.9<$ D2/(D1+D3)$<1.1$.

In an implementation mode, $\Delta T1$ is a zooming movement distance of the second lens group from the wide-angle end position to the telephoto end position on the optical axis, and an effective focal length fG2 of the second lens group and $\Delta T1$ satisfy: $2.0<$ fG2/|$\Delta T1$|$\leq 2.6$.

In an implementation mode, $\Delta T3$ is a zooming movement distance of the third lens group from the wide-angle end position to the telephoto end position on the optical axis, $\Delta T1$ is a zooming movement distance of the second lens group from the wide-angle end position to the telephoto end position on the optical axis, and $\Delta T3$ and $\Delta T1$ satisfy: $1.5<$|$\Delta T3$|/|$\Delta T1$|$\leq 2.0$.

In an implementation mode, TTL is a total optical length of the zoom lens assembly, and TTL and an effective focal length ft of the zoom lens assembly at the telephoto end position satisfy: TTL/ft$\leq 0.95$.

In an implementation mode, Fno is a numerical aperture of the zoom lens assembly in different zoom states, and Fno satisfies: $2.4 \leq$ Fno$<4.5$.

In an implementation mode, an effective focal length fw of the zoom lens assembly at the wide-angle end position and an effective focal length ft of the zoom lens assembly at the telephoto end position satisfy: $1.5<$ ft/fw$<2.0$.

In an implementation mode, the first lens group includes a first lens and a second lens. The second lens group includes a third lens, a fourth lens and a fifth lens. One of the third lens, the fourth lens and the fifth lens is a glass lens. The third lens group includes a sixth lens and a seventh lens.

In an implementation mode, an effective focal length fw of the zoom lens assembly at the wide-angle end position and an effective focal length f3 of the third lens satisfy: $1.0<$ fw/f3$\leq 1.5$.

In an implementation mode, an effective focal length fw of the zoom lens assembly at the wide-angle end position and an effective focal length f7 of the seventh lens satisfy: $-2.0<$ fw/f7$\leq-1.4$.

According to another aspect of the disclosure, a zoom lens assembly is provided, which sequentially includes, from an object side to an image side along an optical axis thereof: a first lens group, multiple lenses in the first lens group being spaced; a second lens group with a positive refractive power, multiple lenses in the second lens group being spaced; and a third lens group with a negative refractive power, multiple lenses in the third lens group being spaced. The second lens group and the third lens group move along the optical axis to implement continuous zooming. The zoom lens assembly has a wide-angle end position, a middle end position and a telephoto end position. $\Delta T3$ is a zooming movement distance of the third lens group from the wide-angle end position to the telephoto end position on the optical axis, and an effective focal length fG3 of the third lens group and $\Delta T3$ satisfy: $-2.0<$ fG3/|$\Delta T3$|$\leq-1.4$.

In an implementation mode, an effective focal length fw of the zoom lens assembly at the wide-angle end position and an effective focal length fG1 of the first lens group satisfy: $-0.5<$ fw/fG1$<0$.

In an implementation mode, an effective focal length fw of the zoom lens assembly at the wide-angle end position and the effective focal length fG3 of the third lens group satisfy: $-1.5<fw/fG3\le-1.0$.

In an implementation mode, an effective focal length fG2 of the second lens group and the effective focal length fG3 of the third lens group satisfy: $-1.5<fG3/fG2<-1.0$.

In an implementation mode, a center thickness D1 of the first lens group, a center thickness D2 of the second lens group and a center thickness D3 of the third lens group satisfy: $0.9<D2/(D1+D3)<1.1$.

In an implementation mode, $\Delta T1$ is a zooming movement distance of the second lens group from the wide-angle end position to the telephoto end position on the optical axis, and an effective focal length fG2 of the second lens group and $\Delta T1$ satisfy: $2.0<fG2/|\Delta T1|\le2.6$.

In an implementation mode, EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, EPD and ImgH and DTmax satisfy: $EPD*ImgH/DTmax>6.5$ mm.

In an implementation mode, $\Delta T3$ is the zooming movement distance of the third lens group from the wide-angle end position to the telephoto end position on the optical axis, $\Delta T1$ is a zooming movement distance of the second lens group from the wide-angle end position to the telephoto end position on the optical axis, and $\Delta T3$ and $\Delta T1$ satisfy: $1.5<|\Delta T3|/|\Delta T1|\le2.0$.

In an implementation mode, TTL is a total optical length of the zoom lens assembly, and TTL and an effective focal length ft of the zoom lens assembly at the telephoto end position satisfy: $TTL/ft\le0.95$.

In an implementation mode, Fno is a numerical aperture of the zoom lens assembly in different zoom states, and Fno satisfies: $2.4\le Fno<4.5$.

In an implementation mode, an effective focal length fw of the zoom lens assembly at the wide-angle end position and an effective focal length ft of the zoom lens assembly at the telephoto end position satisfy: $1.5<ft/fw<2.0$.

In an implementation mode, the first lens group includes a first lens and a second lens. The second lens group includes a third lens, a fourth lens and a fifth lens. One of the third lens, the fourth lens and the fifth lens is a glass lens. The third lens group includes a sixth lens and a seventh lens.

In an implementation mode, an effective focal length fw of the zoom lens assembly at the wide-angle end position and an effective focal length f3 of the third lens satisfy: $1.0<fw/f3\le1.5$.

In an implementation mode, an effective focal length fw of the zoom lens assembly at the wide-angle end position and an effective focal length f7 of the seventh lens satisfy: $-2.0<fw/f7\le-1.4$.

With the application of the technical solution of the disclosure, a zoom lens assembly sequentially includes, from an object side to an image side along an optical axis thereof, a first lens group, a second lens group and a third lens group. Multiple lenses in the first lens group are spaced.

The second lens group has a positive refractive power. Multiple lenses in the second lens group are spaced. The third lens group has a negative refractive power. Multiple lenses in the third lens group are spaced. The second lens group and the third lens group move along the optical axis to implement continuous zooming. The zoom lens assembly has a wide-angle end position, a middle end position and a telephoto end position. EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, EPD and ImgH and DTmax satisfy: $EPD*ImgH/DTmax>6.5$ mm.

The refractive power is configured reasonably, so that astigmatism and a distortion may be reduced effectively, and the imaging quality of the zoom lens assembly may be improved greatly.

Under the restriction of the thickness of a mobile phone, the height of the zoom lens assembly needs to be trimmed, and particularly, the heights of the second lens group and the third lens group are restricted greatly. The second lens group has a positive refractive power, and the third lens group has a negative refractive power. Such a configuration manner is advantageous to the reduction of heights of the lenses in the lens groups. Meanwhile, EPD is the entrance pupil diameter, ImgH is a half of the diagonal length of the effective pixel region on the imaging surface of the zoom lens assembly, DTmax is the maximum value in the effective radii of each lens in the first lens group, the second lens group and the third lens group, and a relationship between EPD, ImgH and DTmax may be restricted not only to ensure the achievement of a larger aperture and imaging surface to improve the imaging quality but also to avoid the condition that effective radius of the lenses need to be cut excessively to satisfy the height of the lens assembly because apertures of the lenses are too large.

Excessive cutting may sharply reduce the optical performance of the whole zoom lens assembly and simultaneously increase difficulties in procedures of machining, assembling, etc.

BRIEF DESCRIPTION OF THE DRAWINGS

The drawings forming a part of the disclosure in the specification are adopted to provide a further understanding to the disclosure. Schematic embodiments of the disclosure and descriptions thereof are adopted to explain the disclosure and not intended to form improper limits to the disclosure. In the drawings.

Figure 1:
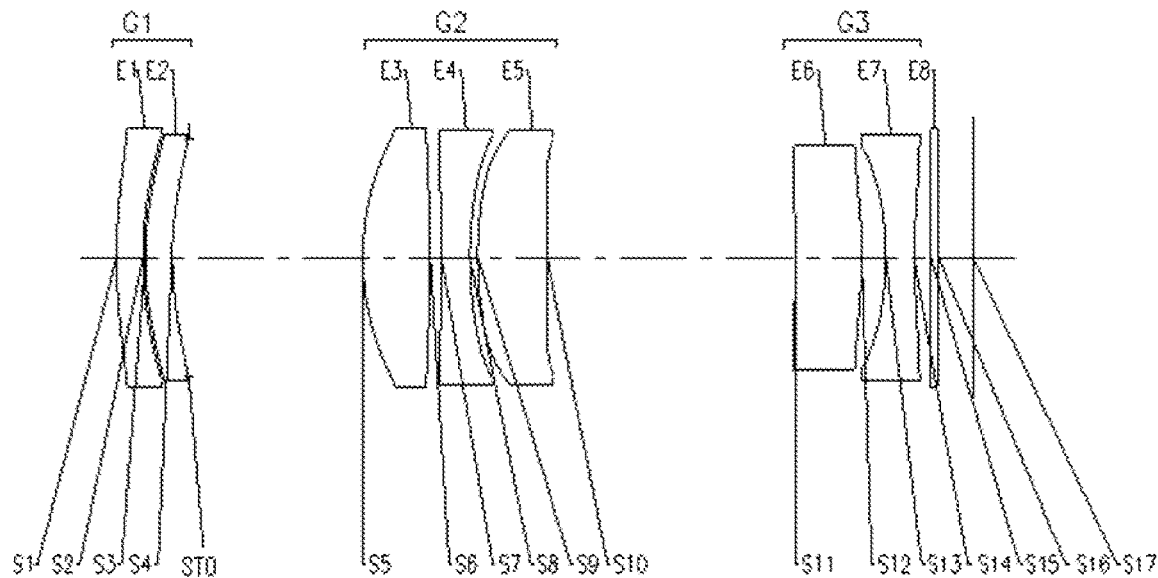
FIG. 1 shows a structure diagram of a zoom lens assembly at a wide-angle end position according to Example 1 of the disclosure.

The drawings include the following reference signs:

G1: first lens group; E1: first lens; S1: object-side surface of the first lens; S2: image-side surface of the first lens; E2: second lens; S3: object-side surface of the second lens; S4: image-side surface of the second lens; STO: diaphragm; G2: second lens group; E3: third lens; S5: object-side surface of the third lens; S6: image-side surface of the third lens; E4: fourth lens; S7: object-side surface of the fourth lens; S8: image-side surface of the fourth lens; E5: fifth lens; S9: object-side surface of the fifth lens; S10: image-side surface of the fifth lens; G3: third lens group; E6: sixth lens; S11: object-side surface of the sixth lens; S12: image-side surface of the sixth lens; E7: seventh lens; S13: object-side surface of the seventh lens; S14: image-side surface of the seventh lens; E8: optical filter; S15: object-side surface of the optical filter; S16: image-side surface of the optical filter; and S17: imaging surface.

DETAILED DESCRIPTION OF THE EMBODIMENTS

It is to be noted that the embodiments in the disclosure and characteristics in the embodiments may be combined without conflicts. The disclosure will be described below with reference to the drawings and in combination with the embodiments in detail.

It is to be pointed out that, unless otherwise specified, all technical and scientific terms used in the disclosure have the same meanings as commonly understood by those of ordinary skill in the art of the disclosure.

In the disclosure, unless conversely specified, the used orientation terms "upper, lower, top, and bottom" are usually for the directions shown in the drawings, or for a component in a vertical, perpendicular, or gravity direction. Similarly, for convenient understanding and description, "inner and outer" refer to inner and outer relative to a contour of each component. However, these orientation terms are not intended to limit the disclosure.

In order to solve the problem of low imaging quality of a zoom lens assembly in the prior art, the disclosure provides a zoom lens assembly.

Embodiment 1

As shown in FIGS. 1-48, a zoom lens assembly sequentially includes, from an object side to an image side along an optical axis thereof, a first lens group G1, a second lens group G2 and a third lens group G3. Multiple lenses in the first lens group G1 are spaced. The second lens group G2 has a positive refractive power. Multiple lenses in the second lens group G2 are spaced. The third lens group G3 has a negative refractive power. Multiple lenses in the third lens group G3 are spaced. The second lens group G2 and the third lens group G3 move along the optical axis to implement continuous zooming. The zoom lens assembly has a wide-angle end position, a middle end position and a telephoto end position. EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group G1, the second lens group G2 and the third lens group G3, EPD and ImgH and DTmax satisfy: EPD*ImgH/DTmax>6.5 mm.

The refractive power is configured reasonably, so that astigmatism and a distortion may be reduced effectively, and the imaging quality of the zoom lens assembly may be improved greatly. Under the restriction of the thickness of a mobile phone, the height of the zoom lens assembly needs to be trimmed, and particularly, the heights of the second lens group G2 and the third lens group G3 are restricted greatly. The second lens group G2 has a positive refractive power, and the third lens group G3 has a negative refractive power. Such a configuration manner is advantageous to the reduction of heights of the lenses in the lens groups. Meanwhile, EPD is the entrance pupil diameter, ImgH is a half of the diagonal length of the effective pixel region on the imaging surface of the zoom lens assembly, DTmax is the maximum value in the effective radii of each lens in the first lens group G1, the second lens group G2 and the third lens group G3, and a relationship between EPD, ImgH and DTmax may be restricted not only to ensure the achievement of a larger aperture and imaging surface to improve the imaging quality, but also to avoid the condition that effective radius of the lenses need to be cut excessively to satisfy the height of the lens assembly because apertures of the lenses are too large. Excessive cutting may sharply reduce the optical performance of the whole zoom lens assembly and simultaneously increase difficulties in procedures of machining, assembling, etc.

Preferably, EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group G1, the second lens group G2 and the third lens group G3, EPD and ImgH and DTmax satisfy: 6.7 mm≤EPD*ImgH/DTmax<6.9 mm.

In the embodiment, an effective focal length fw of the zoom lens assembly at the wide-angle end position and an effective focal length fG1 of the first lens group satisfy: −0.5<fw/fG1<0. Preferably, the effective focal length fw of the zoom lens assembly at the wide-angle end position and the effective focal length fG1 of the first lens group satisfy: −0.3<fw/fG1<−0.2. A ratio of the effective focal length fw of the zoom lens assembly at the wide-angle end position to the effective focal length fG1 of the first lens group is controlled reasonably, so that, on one hand, the zoom lens assembly is helped to obtain more rays and achieve a greater aperture value, and the imaging quality of the zoom lens assembly in a night mode may further be ensured; and on the other hand, a spherical aberration, coma and the like in the system may be balanced better to further improve the imaging quality of the whole zoom lens assembly and simultaneously achieve relatively high resolving power.

In the embodiment, an effective focal length fw of the zoom lens assembly at the wide-angle end position and an effective focal length fG3 of the third lens group satisfy: −1.5<fw/fG3≤−1.0.

Preferably, the effective focal length fw of the zoom lens assembly at the wide-angle end position and the effective focal length fG3 of the third lens group satisfy: −1.2<fw/fG3≤−1.0. A ratio of the effective focal length fw of the zoom lens assembly at the wide-angle end position to the effective focal length fG3 of the third lens group is configured reasonably, so that rays of the previous lens group may be converged and converted into a real image more effectively, and an overall combined focal length value is regulated to meet requirements of each focal length. In addition, a residual aberration generated by the previous lens group is compensated to improve the resolving power.

In the embodiment, an effective focal length fG2 of the second lens group and an effective focal length fG3 of the third lens group satisfy: −1.5<fG3/fG2<−1.0. Preferably, the effective focal length fG2 of the second lens group and the effective focal length fG3 of the third lens group satisfy: −1.3<fG3/fG2<−1.1. A ratio of the effective focal length fG2 of the second lens group and the effective focal length fG3 of the third lens group is configured reasonably, so that, on one hand, the aperture of the whole lens may be controlled favorably to avoid an excessive trimming ratio of the lens; and on the other hand, the focal length value is configured reasonably to avoid excessive concentration of the refractive power, which causing excessive optical sensitivity of a certain lens group to further pose great challenges to the process capability, result in a relatively low yield of the whole system and greatly increase the manufacturing cost.

In the embodiment, a center thickness D1 of the first lens group, a center thickness D2 of the second lens group and a center thickness D3 of the third lens group satisfy: 0.9<D2/(D1+D3)<1.1. The thickness configuration of the three lens groups is controlled reasonably, so that problems about practical forming, assembling and the like brought by unreasonable thickness distribution are solved. An excessively large thickness may make it impossible to effectively release a stress of the lens and seriously affect the imaging quality. An excessively small thickness may cause a great deformation in an assembling process to further change the surface type of the lens and sharply reduce the performance of the zoom lens assembly. In addition, reasonable configuration may balance field curvatures at a wide-angle end and a telephoto end to control defocusing at a relatively high level.

In the embodiment, ΔT1 is a zooming movement distance of the second lens group from the wide-angle end position to the telephoto end position on the optical axis, and an effective focal length fG2 of the second lens group and ΔT1 satisfy: 2.0<fG2/|ΔT1|≤2.6. Preferably, the effective focal length fG2 of the second lens group and the zooming movement distance ΔT1 of the second lens group from the wide-angle end position to the telephoto end position on the optical axis satisfy: 2.3<fG2/|ΔT1|≤2.6. A ratio of the effective focal length fG2 of the second lens group and the zooming movement distance ΔT1 of the second lens group from the wide-angle end position to the telephoto end position on the optical axis is controlled reasonably, so that it is ensured that a stroke is in a reasonable range, a stroke requirement of a motor is met, the total length of the whole zoom system is reduced, miniaturization of the zoom lens assembly is ensured, and a requirement on a light and thin design of a mobile phone is met. In addition, rays of the previous group may be effectively converged to further reduce the aperture of the lens, and meanwhile, it is ensured as much as possible that propagation trends of rays under different movement distances are as smooth as possible to avoid a high sensitivity tolerance brought by excessive deflection.

In the embodiment, ΔT3 is a zooming movement distance of the third lens group from the wide-angle end position to the telephoto end position on the optical axis, and an effective focal length fG3 of the third lens group and ΔT3 satisfy: −2.0<fG3/|ΔT3|≤−1.4. Preferably, the effective focal length fG3 of the third lens group and the zooming movement distance ΔT3 of the third lens group from the wide-angle end position to the telephoto end position on the optical axis satisfy: −1.6<fG3/|ΔT3|≤−1.4. Such a setting is favorable for ensuring that a stroke is in a reasonable range, and may effectively correct a residual aberration of the previous group to ensure a better formed image. Meanwhile, a Chief Ray Angle (CRA) is controlled to solve the problem that no chip may be matched because of an excessive CRA difference of each focal length.

In the embodiment, ΔT3 is a zooming movement distance of the third lens group from the wide-angle end position to the telephoto end position on the optical axis, ΔT1 is a zooming movement distance of the second lens group from the wide-angle end position to the telephoto end position on the optical axis, and ΔT3 and ΔT1 satisfy: 1.5<|ΔT3|/|ΔT1|≤2.0. Preferably, the zooming movement distance ΔT3 of the third lens group from the wide-angle end position to the telephoto end position on the optical axis and the zooming movement distance ΔT1 of the second lens group from the wide-angle end position to the telephoto end position on the optical axis satisfy: 1.7<|ΔT3|/|ΔT1|≤2.0. By such a setting, on one hand, a requirement on an assembling distance is met to solve the problem of interference caused by excessively short distances of the two lens groups in a running process of a motor. On the other hand, an excessive distance difference between the two lens groups is avoided.

Reasonable distance configuration ensures that two motors simultaneously run to corresponding zooming distances to implement rapid and smooth switching between different focal lengths.

In the embodiment, TTL is a total optical length of the zoom lens assembly, and TTL and an effective focal length ft of the zoom lens assembly at the telephoto end position satisfy: TTL/ft≤0.95.

By such a setting, on one hand, the condition that an excessive length of the zoom lens assembly makes the whole mobile phone too thick and heavy and greatly reduces consumer experiences is avoided. On the other hand, a light and thin design is achieved, meanwhile, a larger focal length may be achieved, and an object may be shot in a macro mode, a remote mode or the like to endow the mobile phone with a richer camera configuration and greatly improve shooting experiences of the user.

In the embodiment, the zoom lens assembly further includes a diaphragm STO. The diaphragm STO is arranged between the first lens group G1 and the second lens group G2. Fno is a numerical aperture of the zoom lens assembly in different zoom states, and Fno satisfies: 2.4≤Fno<4.5. The diaphragm STO is arranged between the first lens group G1 and the second lens group G2, so that a greater aperture change value may be achieved, a shooting requirement may be met better, meanwhile, higher resolving power may be achieved at the telephoto end, and difficulties in design are reduced. In addition, the aperture of the lens may be reduced to help to miniaturize the zoom lens assembly. A distance of the diaphragm STO relative to the second lens group G2 may change to cause a relatively great difference between relative illuminations at the wide-angle end position and the telephoto end position. However, an image algorithm may be used for regulation to avoid the influence on the brightness of a shot image.

In the embodiment, an effective focal length fw of the zoom lens assembly at the wide-angle end position and an effective focal length ft of the zoom lens assembly at the telephoto end position satisfy: 1.5<ft/fw<2.0. Preferably, the effective focal length fw of the zoom lens assembly at the wide-angle end position and the effective focal length ft of the zoom lens assembly at the telephoto end position satisfy: 1.7<ft/fw<1.8. By such a setting, on one hand, an existing process capability and an assembly size requirement are considered, and relatively high resolving power in different focal lengths may be ensured. On the other hand, the zoom lens assembly may be maximally adapted to various shooting scenes, and lossless images of either nearby or distant objects may be obtained by optical zooming. Compared with the image quality of existing digital zooming, the image quality may be improved effectively.

In the embodiment, the first lens group G1 includes a first lens E1 and a second lens E2. The second lens group G2 includes a third lens E3, a fourth lens E4 and a fifth lens E5. One of the third lens E3, the fourth lens E4 and the fifth lens E5 is a glass lens. The third lens group G3 includes a sixth lens E6 and a seventh lens E7. The first lens group G1 uses two lenses matched to obtain rays to a greater extent, and the apertures of the lenses are reduced to be matched with the next lens group to effectively balance a spherical aberration and astigmatism of the system. The second lens group G2 is a zoom group, and the use of the three lenses achieves a greater focal length change under the condition of ensuring that the stroke is as short as possible, and is favorable for achieving a light and thin design of the zoom system. Meanwhile, the use of a glass material may reduce a chromatic aberration of the system better to ensure the color balance of a shot image, may also reduce an inclination angle of the lens to reduce the sensitivity, but also increases the cost. The third lens group selects two lenses, and may further converge rays of the previous group and balance the distortion and astigmatism of the system to improve the imaging quality.

In the embodiment, an effective focal length fw of the zoom lens assembly at the wide-angle end position and an effective focal length f3 of the third lens satisfy: 1.0<fw/f3≤1.5. Preferably, the effective focal length fw of the zoom lens assembly at the wide-angle end position and the effective focal length f3 of the third lens satisfy: 1.1<fw/f3≤1.5. By such a setting, on the one hand, rays of the previous group may be maximally converged, and a relatively great focal length change is achieved in a relatively small stroke range by matching with the movement of the other two lenses of the second lens group G2. On the other hand, the spherical aberration, coma and astigmatism of the system are effectively balanced, and the resolving power is improved.

In the embodiment, an effective focal length fw of the zoom lens assembly at the wide-angle end position and an effective focal length f7 of the seventh lens satisfy: −2.0<fw/f7≤−1.4. Preferably, the effective focal length fw of the zoom lens assembly at the wide-angle end position and the effective focal length f7 of the seventh lens satisfy: −1.7<fw/f7≤−1.4. Such a setting is favorable for selecting the material and shape of the seventh lens E7 to facilitate machining, improve the practical yield of a single product and simultaneously reduce the cost. In addition, the distortion of the system may be balanced better to avoid obvious deformations for shooting quality of different focal lengths. Moreover, the matching degree of a CRA and a chip is favorably controlled to meet an algorithm requirement.

Embodiment 2

A zoom lens assembly sequentially includes, from an object side to an image side along an optical axis thereof, a first lens group G1, a second lens group G2 and a third lens group G3. Multiple lenses in the first lens group G1 are spaced. The second lens group G2 has a positive refractive power, and multiple lenses in the second lens group G2 are spaced. The third lens group G3 has a negative refractive power, and multiple lenses in the third lens group G3 are spaced. The second lens group G2 and the third lens group G3 move along the optical axis to implement continuous zooming. The zoom lens assembly has a wide-angle end position, a middle end position and a telephoto end position. ΔT3 is a zooming movement distance of the third lens group from the wide-angle end position to the telephoto end position on the optical axis, and an effective focal length fG3 of the third lens group and ΔT3 satisfy: −2.0<fG3/|ΔT3|≤−1.4.

Preferably, the effective focal length fG3 of the third lens group and the zooming movement distance ΔT3 of the third lens group from the wide-angle end position to the telephoto end position on the optical axis satisfy: −1.6<fG3/|ΔT3|≤−1.4. The refractive power is configured reasonably, so that astigmatism and a distortion may be reduced effectively, and the imaging quality of the zoom lens assembly may be improved greatly. In addition, such a setting is favorable for ensuring that a stroke is in a reasonable range, and may effectively correct a residual aberration of the previous group to ensure a better formed image. Meanwhile, a CRA is controlled to solve the problem that no chip may be matched because of an excessive CRA difference of each focal length.

In the embodiment, an effective focal length fw of the zoom lens assembly at the wide-angle end position and an effective focal length fG1 of the first lens group satisfy: $-0.5<fw/fG1<0$. Preferably, the effective focal length fw of the zoom lens assembly at the wide-angle end position and the effective focal length fG1 of the first lens group satisfy: $-0.3<fw/fG1<-0.2$. A ratio of the effective focal length fw of the zoom lens assembly at the wide-angle end position to the effective focal length fG1 of the first lens group is controlled reasonably, so that, on one hand, the zoom lens assembly is helped to obtain more rays and achieve a greater aperture value, and the imaging quality of the zoom lens assembly in a night mode may further be ensured; and on the other hand, a spherical aberration, coma and the like in the system may be balanced better to further improve the imaging quality of the whole zoom lens assembly and simultaneously achieve relatively high resolving power.

In the embodiment, an effective focal length fw of the zoom lens assembly at the wide-angle end position and an effective focal length fG3 of the third lens group satisfy: $-1.5<fw/fG3\leq-1.0$. Preferably, the effective focal length fw of the zoom lens assembly at the wide-angle end position and the effective focal length fG3 of the third lens group satisfy: $-1.2<fw/fG3\leq-1.0$. A ratio of the effective focal length fw of the zoom lens assembly at the wide-angle end position to the effective focal length fG3 of the third lens group is configured reasonably, so that rays of the previous lens group may be converged and converted into a real image more effectively, and an overall combined focal length value is regulated to meet requirements of each focal length. In addition, a residual aberration generated by the previous group is compensated to improve the resolving power.

In the embodiment, an effective focal length fG2 of the second lens group and the effective focal length fG3 of the third lens group satisfy: $-1.5<fG3/fG2<-1.0$. Preferably, the effective focal length fG2 of the second lens group and the effective focal length fG3 of the third lens group satisfy: $-1.3<fG3/fG2<-1.1$. A ratio of the effective focal length fG2 of the second lens group and the effective focal length fG3 of the third lens group is configured reasonably, so that, on one hand, the aperture of the whole lens may be controlled favorably to avoid an excessive trimming ratio of the lens; and on the other hand, the focal length value is configured reasonably to avoid excessive concentration of the refractive power, which causing excessive optical sensitivity of a certain lens group to further pose great challenges to the process capability, result in a relatively low yield of the whole system and greatly increase the manufacturing cost.

In the embodiment, a center thickness D1 of the first lens group, a center thickness D2 of the second lens group and a center thickness D3 of the third lens group satisfy: $0.9<D2/(D1+D3)<1.1$. The thickness configuration of the three lens groups is controlled reasonably, so that problems about practical forming, assembling and the like brought by unreasonable thickness distribution are solved. An excessively large thickness may make it impossible to effectively release a stress of the lens and seriously affect the imaging quality. An excessively small thickness may cause a great deformation in an assembling process to further change the surface type of the lens and sharply reduce the performance of the zoom lens assembly. In addition, reasonable configuration may balance field curvatures at a wide-angle end and a telephoto end to control defocusing at a relatively high level.

In the embodiment, ΔT1 is a zooming movement distance of the second lens group from the wide-angle end position to the telephoto end position on the optical axis, and an effective focal length fG2 of the second lens group and ΔT1 satisfy: $2.0<fG2/|\Delta T1|\leq 2.6$. Preferably, the effective focal length fG2 of the second lens group and the zooming movement distance ΔT1 of the second lens group from the wide-angle end position to the telephoto end position on the optical axis satisfy: $2.3<fG2/|\Delta T1|\leq 2.6$. A ratio of the effective focal length fG2 of the second lens group and the zooming movement distance ΔT1 of the second lens group from the wide-angle end position to the telephoto end position on the optical axis is controlled reasonably, so that it is ensured that a stroke is in a reasonable range, a stroke requirement of a motor is met, the total length of the whole zoom system is reduced, miniaturization of the zoom lens assembly is ensured, and a requirement on a light and thin design of a mobile phone is met. In addition, rays of the previous lens group may be effectively converged to further reduce the aperture of the lens, and meanwhile, it is ensured as much as possible that propagation trends of rays under different movement distances are as smooth as possible to avoid a high sensitivity tolerance brought by excessive deflection.

In the embodiment, EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group G1, the second lens group G2 and the third lens group G3, EPD and ImgH and DTmax satisfy: EPD*ImgH/DTmax>6.5 mm. Preferably, EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group G1, the second lens group G2 and the third lens group G3, EPD and ImgH and DTmax satisfy: 6.7 mm≤EPD*ImgH/DTmax<6.9 mm.

Under the restriction of the thickness of a mobile phone, the height of the zoom lens assembly needs to be trimmed, and particularly, the heights of the second lens group G2 and the third lens group G3 are restricted greatly. The second lens group G2 has a positive refractive power, and the third lens group G3 has a negative refractive power. Such a configuration manner is advantageous to the reduction of heights of the lenses in the lens groups. Meanwhile, EPD is the entrance pupil diameter, ImgH is a half of the diagonal length of the effective pixel region on the imaging surface of the zoom lens assembly, DTmax is the maximum value in the effective radii of each lens in the first lens group G1, the second lens group G2 and the third lens group G3, and a relationship between EPD, ImgH and DTmax may be restricted not only to ensure the achievement of a larger aperture and imaging surface to improve the imaging quality, but also to avoid the condition that effective radius of the lenses need to be cut excessively to satisfy the height of the lens assembly because apertures of the lenses are too large. Excessive cutting may sharply reduce the optical performance of the whole zoom lens assembly and simultaneously increase difficulties in procedures of machining, assembling, etc.

In the embodiment, ΔT3 is a zooming movement distance of the third lens group from the wide-angle end position to the telephoto end position on the optical axis, ΔT1 is a zooming movement distance of the second lens group from the wide-angle end position to the telephoto end position on the optical axis, and ΔT3 and ΔT1 satisfy: $1.5<|\Delta T3|/|\Delta T1|\leq 2.0$. Preferably, the zooming movement distance ΔT3 of the third lens group from the wide-angle end position to the telephoto end position on the optical axis and the zooming movement distance ΔT1 of the second lens group from the wide-angle end position to the telephoto end position on the optical axis satisfy: 1.7<|ΔT3|/|ΔT1|≤2.0. By such a setting, on one hand, a requirement on an assembling distance is met to solve the problem of interference caused by excessively short distances of the two lens groups in a running process of a motor. On the other hand, an excessive distance difference between the two lens groups is avoided. Reasonable distance configuration ensures that two motors simultaneously run to corresponding zooming distances to implement rapid and smooth switching between different focal lengths.

In the embodiment, TTL is a total optical length of the zoom lens assembly, and TTL and an effective focal length ft of the zoom lens assembly at the telephoto end position satisfy: TTL/ft≤0.95.

By such a setting, on one hand, the condition that an excessive length of the zoom lens assembly makes the whole mobile phone too thick and heavy and greatly reduces consumer experiences is avoided. On the other hand, a light and thin design is achieved, meanwhile, a larger focal length may be achieved, and an object may be shot in a macro mode, a remote mode or the like to endow the mobile phone with a richer camera configuration and greatly improve shooting experiences of the user.

In the embodiment, the zoom lens assembly further includes a diaphragm STO. The diaphragm STO is arranged between the first lens group G1 and the second lens group G2. Fno is a numerical aperture of the zoom lens assembly in different zoom states, and Fno satisfies: 2.4≤Fno<4.5. The diaphragm STO is arranged between the first lens group G1 and the second lens group G2, so that a greater aperture change value may be achieved, a shooting requirement may be met better, meanwhile, higher resolving power may be achieved at the telephoto end, and difficulties in design are reduced. In addition, the aperture of the lens may be reduced to help to miniaturize the zoom lens assembly. A distance of the diaphragm STO relative to the second lens group G2 may change to cause a relatively great difference between relative illuminations at the wide-angle end position and the telephoto end position. However, an image algorithm may be used for regulation to avoid the influence on the brightness of a shot image.

In the embodiment, an effective focal length fw of the zoom lens assembly at the wide-angle end position and an effective focal length ft of the zoom lens assembly at the telephoto end position satisfy: 1.5<ft/fw<2.0. Preferably, the effective focal length fw of the zoom lens assembly at the wide-angle end position and the effective focal length ft of the zoom lens assembly at the telephoto end position satisfy: 1.7<ft/fw<1.8. By such a setting, on one hand, an existing process capability and an assembly size requirement are considered, and relatively high resolving power in different focal lengths may be ensured. On the other hand, the zoom lens assembly may be maximally adapted to various shooting scenes, and lossless images of either nearby or distant objects may be obtained by optical zooming. Compared with the image quality of existing digital zooming, the image quality may be improved effectively.

In the embodiment, the first lens group G1 includes a first lens E1 and a second lens E2. The second lens group G2 includes a third lens E3, a fourth lens E4 and a fifth lens E5. One of the third lens E3, the fourth lens E4 and the fifth lens E5 is a glass lens. The third lens group G3 includes a sixth lens E6 and a seventh lens E7. The first lens group G1 uses two lenses matched to obtain rays to a greater extent, and the apertures of the lenses are reduced to be matched with the next lens group to effectively balance a spherical aberration and astigmatism of the system. The second lens group G2 is a zoom group, and the use of the three lenses achieves a greater focal length change under the condition of ensuring that the stroke is as short as possible, and is favorable for achieving a light and thin design of the zoom system. Meanwhile, the use of a glass material may reduce a chromatic aberration of the system better to ensure the color balance of a shot image, may also reduce an inclination angle of the lens to reduce the sensitivity, but also increases the cost. The third lens group selects two lenses, and may further converge rays of the previous group and balance the distortion and astigmatism of the system to improve the imaging quality.

In the embodiment, an effective focal length fw of the zoom lens assembly at the wide-angle end position and an effective focal length f3 of the third lens satisfy: 1.0<fw/f3≤1.5. Preferably, the effective focal length fw of the zoom lens assembly at the wide-angle end position and the effective focal length f3 of the third lens satisfy: 1.1<fw/f3≤1.5. By such a setting, on the one hand, rays of the previous group may be maximally converged, and a relatively great focal length change is achieved in a relatively small stroke range by matching with the movement of the other two lenses of the second lens group G2. On the other hand, the spherical aberration, coma and astigmatism of the system are effectively balanced, and the resolving power is improved.

In the embodiment, an effective focal length fw of the zoom lens assembly at the wide-angle end position and an effective focal length f7 of the seventh lens satisfy: −2.0<fw/f7≤−1.4. Preferably, the effective focal length fw of the zoom lens assembly at the wide-angle end position and the effective focal length f7 of the seventh lens satisfy: −1.7<fw/f7≤−1.4. Such a setting is favorable for selecting the material and shape of the seventh lens E7 to facilitate machining, improve the practical yield of a single product and simultaneously reduce the cost. In addition, the distortion of the system may be balanced better to avoid obvious deformations for shooting quality of different focal lengths. Moreover, the matching degree of a CRA and a chip is favorably controlled to meet an algorithm requirement.

Optionally, the zoom lens assembly may further include an optical filter configured to correct a chromatic aberration and/or protective glass configured to protect a photosensitive element on the imaging surface.

The zoom lens assembly in the disclosure may adopt multiple lenses, for example, the above-mentioned seven. The refractive power and surface types of each lens, the center thickness of each lens, on-axis distances between the lenses and the like may be reasonably configured to effectively enlarge an aperture of the zoom lens assembly, reduce the sensitivity of the lens assembly, improve the machinability of the lens assembly and ensure that the zoom lens assembly is more favorable for production and machining and applicable to a portable electronic device such as a smart phone. The zoom lens assembly also has the advantages of large aperture, ultra-thin design and high imaging quality, and may meet a miniaturization requirement of an intelligent electronic product.

In the disclosure, at least one of mirror surfaces of the lenses is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality.

However, those skilled in the art should know that the number of the lenses forming the zoom lens assembly may be changed without departing from the technical solutions claimed in the disclosure to achieve each result and advantage described in the specification. For example, although descriptions are made in the implementation mode with seven lenses as an example, the zoom lens assembly is not limited to seven lenses. If necessary, the zoom lens assembly may also include another number of lenses.

Examples of specific surface types and parameters applicable to the zoom lens assembly of the above-mentioned implementation mode will further be described below with reference to the drawings.

It is to be noted that any one of the following Example 1 to Example 4 is applicable to all embodiments of the disclosure.

Example 1

Figure 2:
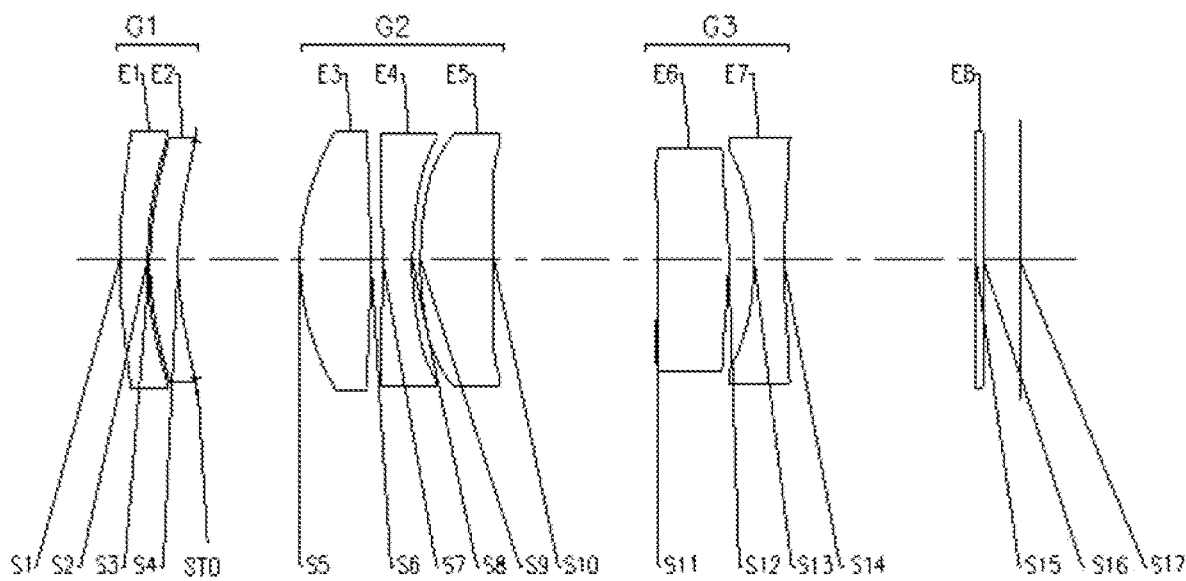
FIG. 2 shows a structure diagram of a zoom lens assembly at a middle end position according to Example 1 of the disclosure.
Figure 3:
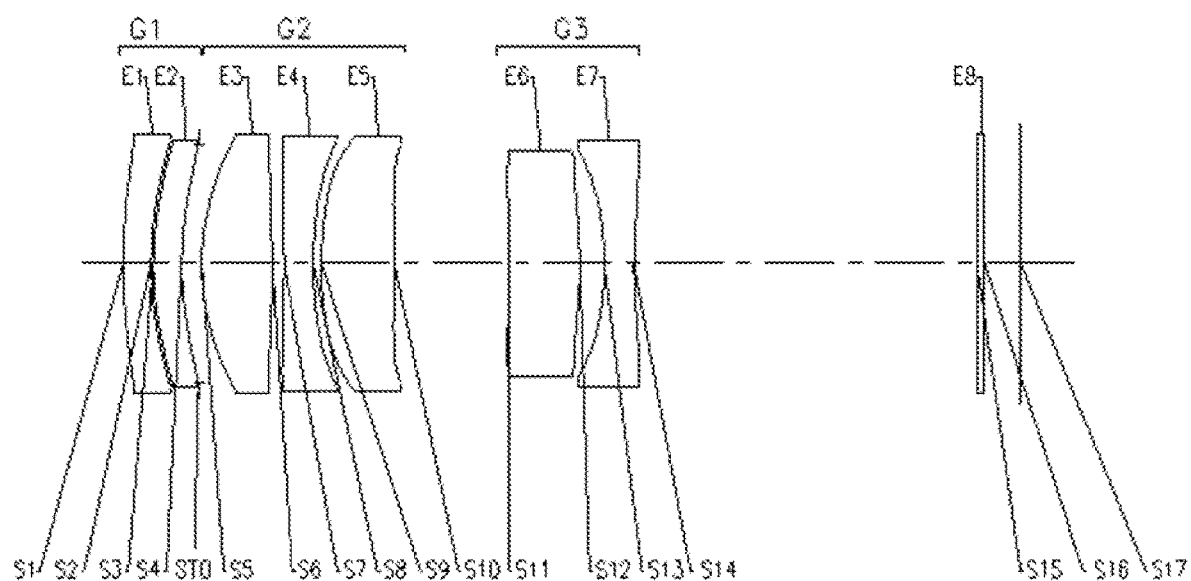
FIG. 3 shows a structure diagram of a zoom lens assembly at a telephoto end position according to Example 1 of the disclosure.

As shown in FIGS. 1-12, a zoom lens assembly according to Example 1 of the disclosure is described. FIG. 1 is a structure diagram of a zoom lens assembly at a wide-angle end position according to Example 1. FIG. 2 is a structure diagram of zoom lens assembly at a middle end position according to Example 1. FIG. 3 is a structure diagram of a zoom lens assembly at a telephoto end position according to Example 1.

As shown in FIGS. 1-3, the zoom lens assembly sequentially includes, from an object side to an image side, a first lens group G1, a diaphragm STO, a second lens group G2, a third lens group G3, an optical filter E8, and an imaging surface S17. The first lens group G1 includes a first lens E1 and a second lens E2. The second lens group G2 includes a third lens E3, a fourth lens E4, and a fifth lens E5. The third lens group G3 includes a sixth lens E6 and a seventh lens E7.

The first lens E1 has a positive refractive power or a negative refractive power, an object-side surface S1 of the first lens is a convex surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a convex surface. The fourth lens E4 has a positive refractive power or a negative refractive power, an object-side surface S7 of the fourth lens is a concave surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a convex surface. The sixth lens E6 has a positive refractive power or a negative refractive power, an object-side surface S11 of the sixth lens is a concave surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a concave surface. The optical filter E8 has an object-side surface S15 of the optical filter and an image-side surface S16 of the optical filter. Light from an object sequentially penetrates through each of the surfaces S1 to S16, and is finally imaged on the imaging surface S17.

Table 1 shows a table of basic parameters for the zoom lens assembly of Example 1, and the units of the curvature radius, the thickness/distance and the focal length are all millimeter (mm).

TABLE 1

| Surface number | Surface type | Curvature radius | Thickness | Material Refractive index | Abbe number | Conic coefficient |
| --- | --- | --- | --- | --- | --- | --- |
| OBJ | Spherical | Infinite | Infinite | | | |
| S1 | Aspheric | 16.0744 | 0.7500 | 1.546 | 55.82 | 4.9676 |
| S2 | Aspheric | 10.2099 | 0.0600 | | | 0.9183 |
| S3 | Aspheric | 8.0369 | 0.7631 | 1.678 | 19.21 | −6.0717 |
| S4 | Aspheric | 8.1003 | 0.4994 | | | −7.8576 |
| STO | Spherical | Infinite | T1 | | | |
| S5 | Aspheric | 6.3512 | 1.9084 | 1.518 | 64.2 | −0.4138 |
| S6 | Aspheric | −39.3199 | 0.3180 | | | 93.0254 |
| S7 | Aspheric | −93.5750 | 0.8000 | 1.645 | 23.54 | 99.9900 |
| S8 | Aspheric | 9.3005 | 0.2200 | | | 0.7074 |
| S9 | Aspheric | 10.2294 | 1.9776 | 1.570 | 37.32 | −0.1880 |
| S10 | Aspheric | −36.1313 | T2 | | | −25.3037 |
| S11 | Aspheric | −20.7769 | 1.8945 | 1.678 | 19.24 | −36.3952 |
| S12 | Aspheric | −11.5519 | 0.6737 | | | −7.1761 |
| S13 | Aspheric | −10.2047 | 0.8000 | 1.537 | 55.82 | −99.0000 |
| S14 | Aspheric | 10.6217 | T3 | | | 6.4529 |
| S15 | Spherical | Infinite | 0.2100 | 1.518 | 64.17 | |
| S16 | Spherical | Infinite | 0.9752 | | | |
| S17 | Spherical | Infinite | | | | |

Table 2 shows parameters of the zoom lens assembly of Example 1. The units of an effective focal length f, a numerical aperture Fno, a distance T1 between the first lens group G1 and the second lens group G2, a distance T2 between the second lens group G2 and the third lens group G3 and a distance T3 between the third lens group G3 and the optical filter E8 are all millimeter (mm). FOV is a maximum field of view of the zoom lens assembly, and the unit of FOV is degree.

TABLE 2

|  | f | FOV | Fno | T1 | T2 | T3 |
|---|---|---|---|---|---|---|
| Wide-angle end | 15.20 | 13.4 | 2.40 | 4.9175 | 7.0520 | 0.4806 |
| Middle end | 20.80 | 9.9 | 3.28 | 2.8035 | 4.4538 | 5.1980 |
| Telephoto end | 26.50 | 7.8 | 4.18 | 0.0474 | 3.1173 | 9.2806 |

In Example 1, both the object-side surface and image-side surface of any lens in the first lens E1 to the seventh lens E7 are aspheric surfaces. A surface type of each aspheric lens may be defined through, but not limited to, the following aspheric surface formula:

$$x = \frac{ch^2}{1 + \sqrt{1 - (k+1)c^2h^2}} + \sum A_i h_i \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 3 shows high-order coefficients A4, A6, A8, A10, A12, A14, A16, A18, and A20 that can be used for each of the aspheric mirror surfaces S1-S14 in Example 1.

TABLE 3

| Surface number | A4 | A6 | A8 | A10 | A12 |
|---|---|---|---|---|---|
| S1 | −6.0629E−02 | −1.4363E−02 | 2.1737E−03 | 6.6748E−06 | −9.9093E−05 |
| S2 | 4.4135E−03 | −1.7078E−02 | 3.1154E−03 | −4.0026E−04 | 4.5029E−05 |
| S3 | −1.2635E−02 | −2.0257E−03 | 4.6171E−04 | −5.8022E−04 | 2.0202E−04 |
| S4 | −4.1573E−02 | 8.6443E−04 | −4.0600E−04 | −2.1903E−04 | 9.9948E−05 |
| S5 | 8.9819E−03 | 9.2581E−04 | −1.8484E−04 | −3.4777E−04 | 0.0000E+00 |
| S6 | 5.4719E−02 | 1.6641E−02 | −3.9978E−03 | −1.1640E−03 | 0.0000E+00 |
| S7 | −1.1797E−02 | 3.0527E−02 | −7.7811E−03 | −1.4345E−03 | 7.5428E−05 |
| S8 | 4.0364E−02 | 4.1656E−02 | −8.6287E−03 | −4.9088E−03 | 1.1794E−03 |
| S9 | 3.2606E−01 | 4.8783E−02 | −4.4709E−03 | −4.2246E−03 | 1.8889E−03 |
| S10 | 2.7214E−01 | 2.8143E−02 | 4.0794E−03 | 2.6155E−04 | 6.9640E−05 |
| S11 | 1.4476E−01 | 1.1480E−03 | −1.2966E−03 | −3.7203E−04 | −1.2963E−04 |
| S12 | 1.6062E−01 | 3.0336E−03 | −2.9598E−03 | −1.6249E−04 | −6.0246E−04 |
| S13 | −5.2416E−01 | 6.2420E−02 | −1.4525E−02 | 2.5531E−03 | −1.0539E−03 |
| S14 | −4.8464E−01 | 3.0332E−02 | −9.1479E−03 | 1.8988E−03 | 3.2457E−04 |

| Surface number | A14 | A16 | A18 | A20 |
|---|---|---|---|---|
| S1 | 5.8208E−05 | 0.0000E+00 | 0.0000E+00 | 0.0000E+00 |
| S2 | 5.4695E−04 | 0.0000E+00 | 0.0000E+00 | 0.0000E+00 |
| S3 | 4.1949E−04 | 0.0000E+00 | 0.0000E+00 | 0.0000E+00 |
| S4 | 2.5100E−05 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | −7.6066E−05 | 0.0000E+00 | 0.0000E+00 | 0.0000E+00 |
| S8 | −2.4991E−05 | 0.0000E+00 | 0.0000E+00 | 0.0000E+00 |
| S9 | −1.0101E−04 | −4.8130E−05 | 3.7842E−06 | 0.0000E+00 |
| S10 | 1.0875E−05 | 0.0000E+00 | 0.0000E+00 | 0.0000E+00 |
| S11 | −2.3271E−05 | −4.0260E−05 | −1.6865E−05 | 4.1616E−06 |
| S12 | −1.0329E−05 | −1.9870E−04 | −1.0456E−04 | 1.7562E−06 |
| S13 | 6.8987E−04 | −4.1276E−04 | −8.0377E−05 | 1.7324E−05 |
| S14 | 4.8927E−04 | −7.7950E−05 | 1.0280E−04 | 4.5683E−05 |

Figure 4:
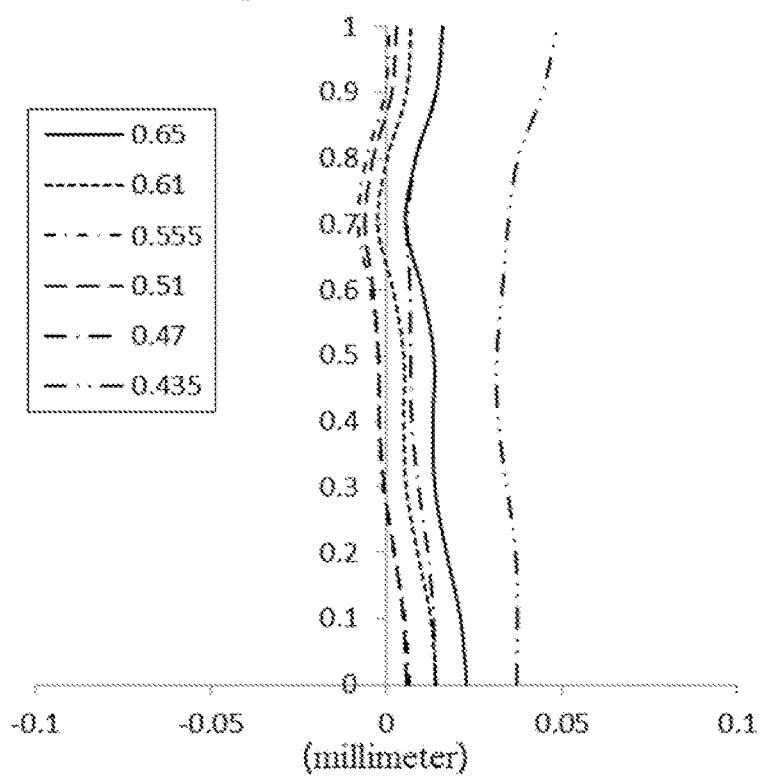
FIGS. 4-6 show a longitudinal aberration curve, an astigmatism curve and a distortion curve of the zoom lens assembly in FIG. 1 respectively.
Figure 5:
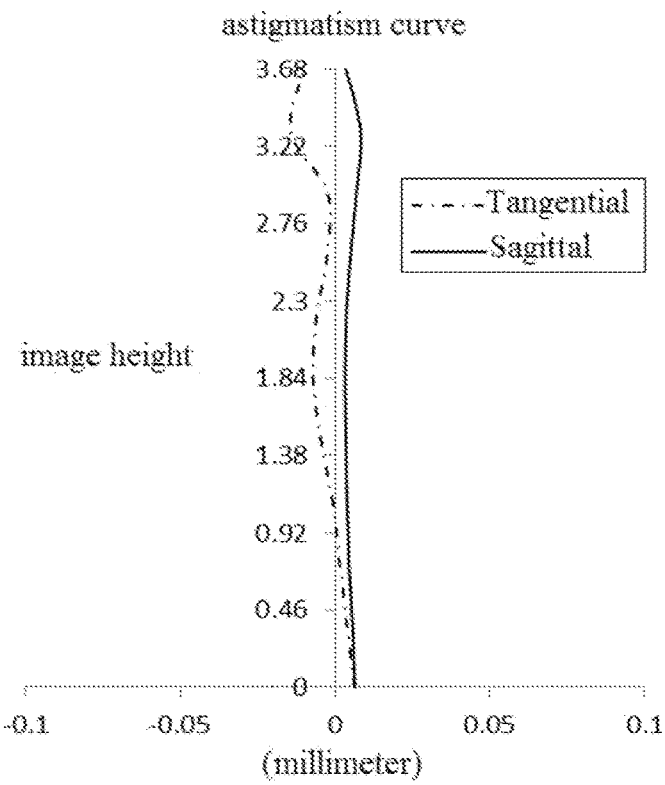
Figure 6:
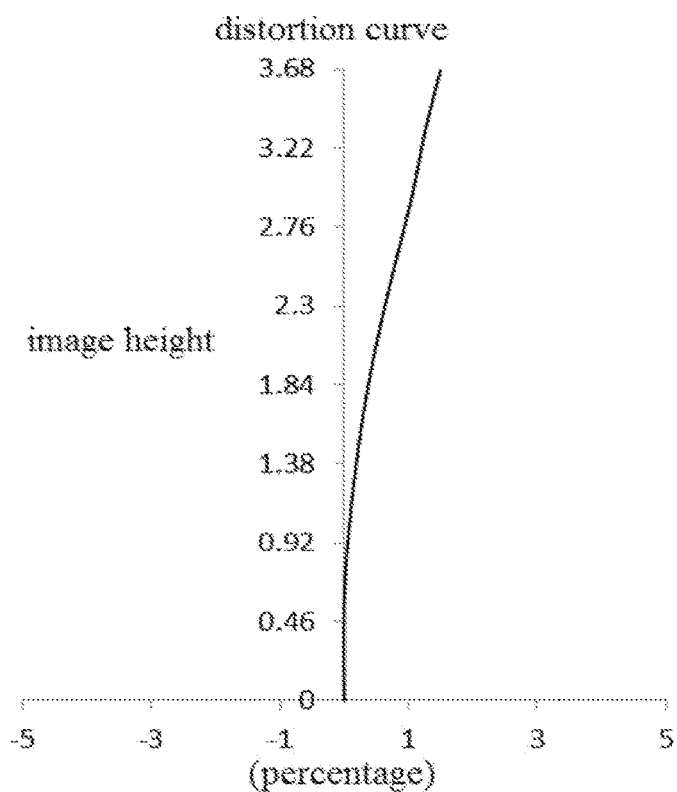

FIG. 4 shows a longitudinal aberration curve of the wide-angle end of the zoom lens assembly according to Example 1 to represent deviations of a convergence focal point after light of different wavelengths passes through the zoom lens assembly. FIG. 5 shows an astigmatism curve of the wide-angle end of the zoom lens assembly according to Example 1 to represent a tangential image surface curvature and a sagittal image surface curvature. FIG. 6 shows a distortion curve of the wide-angle end of the zoom lens assembly according to Example 1 to represent distortion values corresponding to different fields of view.

Figure 7:
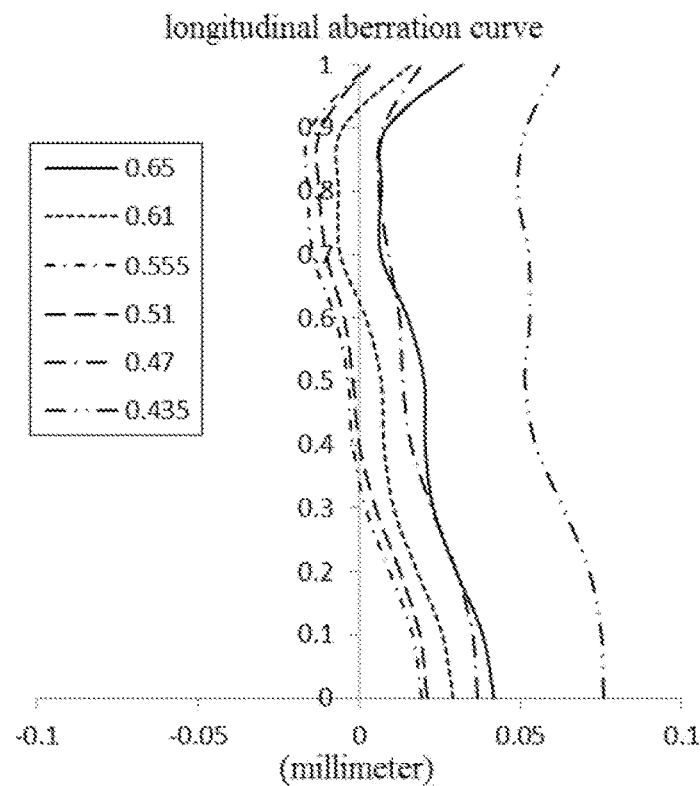
FIGS. 7-9 show a longitudinal aberration curve, an astigmatism curve and a distortion curve of the zoom lens assembly in FIG. 2 respectively.
Figure 8:
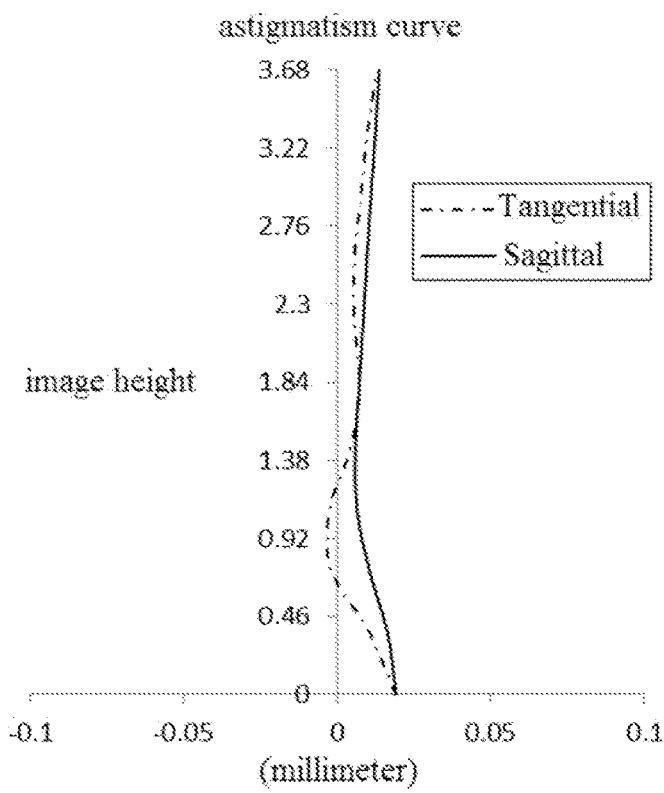
Figure 9:
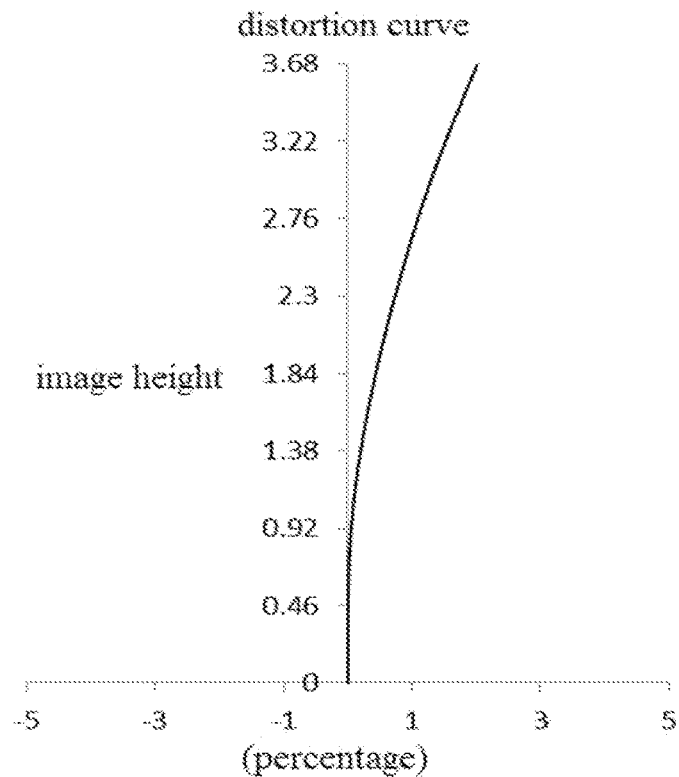

FIG. 7 shows a longitudinal aberration curve of the middle end of the zoom lens assembly according to Example 1 to represent deviations of a convergence focal point after light of different wavelengths passes through the zoom lens assembly. FIG. 8 shows an astigmatism curve of the middle end of the zoom lens assembly according to Example 1 to represent a tangential image surface curvature and a sagittal image surface curvature. FIG. 9 shows a distortion curve of the middle end of the zoom lens assembly according to Example 1 to represent distortion values corresponding to different fields of view.

Figure 10:
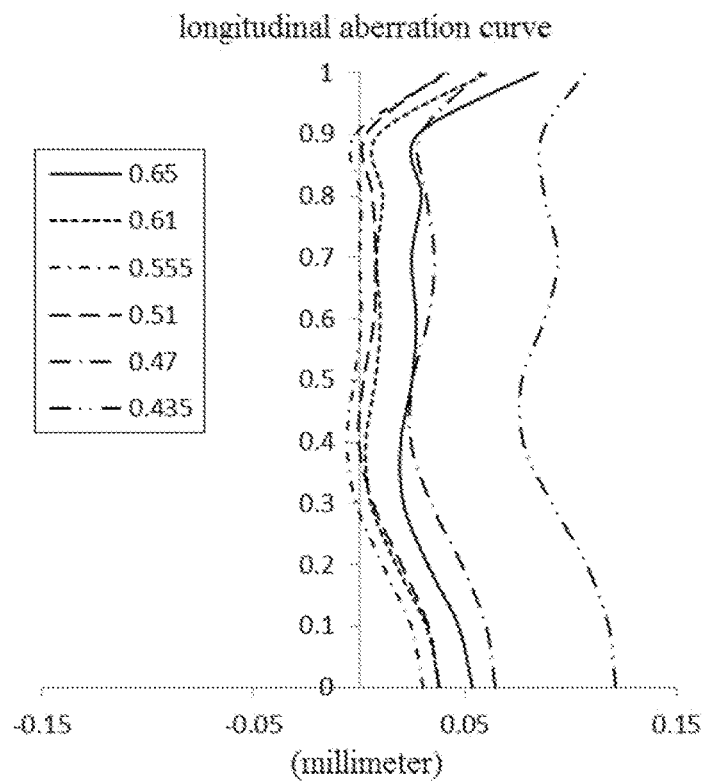
FIGS. 10-12 show a longitudinal aberration curve, an astigmatism curve and a distortion curve of the zoom lens assembly in FIG. 3 respectively.
Figure 11:
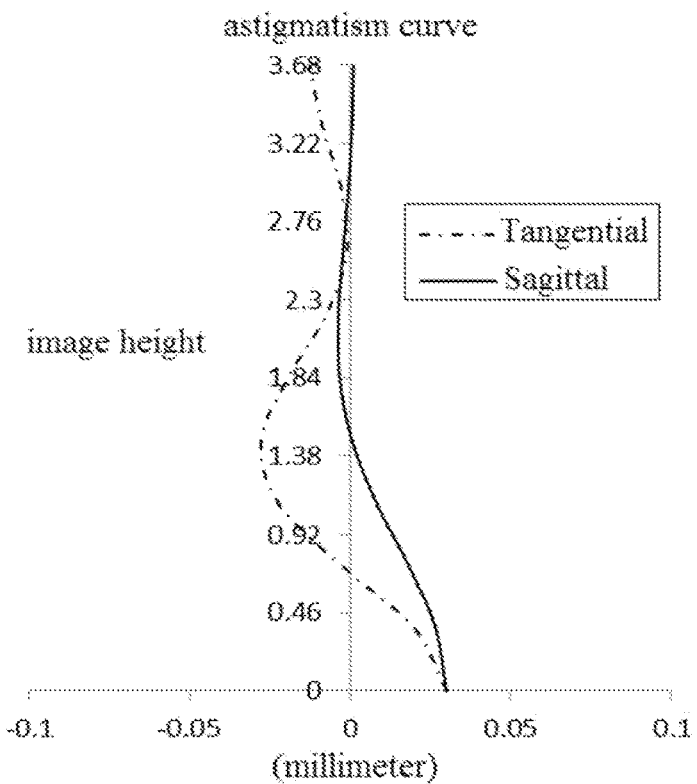
Figure 12:
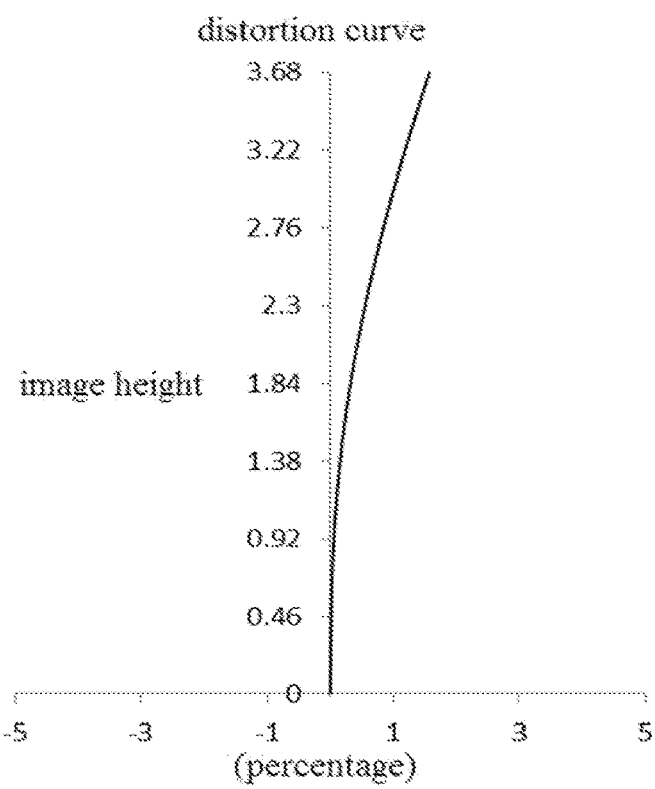

FIG. 10 shows a longitudinal aberration curve of the telephoto end of the zoom lens assembly according to Example 1 to represent deviations of a convergence focal point after light of different wavelengths passes through the zoom lens assembly. FIG. 11 shows an astigmatism curve of the telephoto end of the zoom lens assembly according to Example 1 to represent a tangential image surface curvature and a sagittal image surface curvature. FIG. 12 shows a distortion curve of the telephoto end of the zoom lens assembly according to Example 1 to represent distortion values corresponding to different fields of view.

According to FIGS. 4-12, it can be seen that the zoom lens assembly provided in Example 1 may achieve high imaging quality.

Example 2

Figure 13:
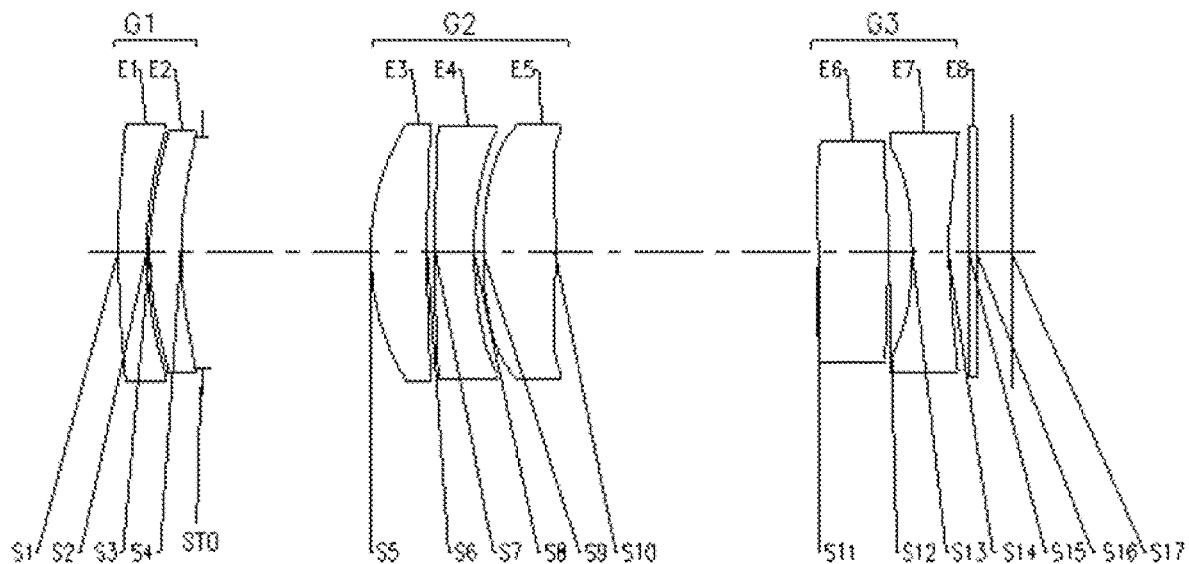
FIG. 13 shows a structure diagram of a zoom lens assembly at a wide-angle end position according to Example 2 of the disclosure.
Figure 14:
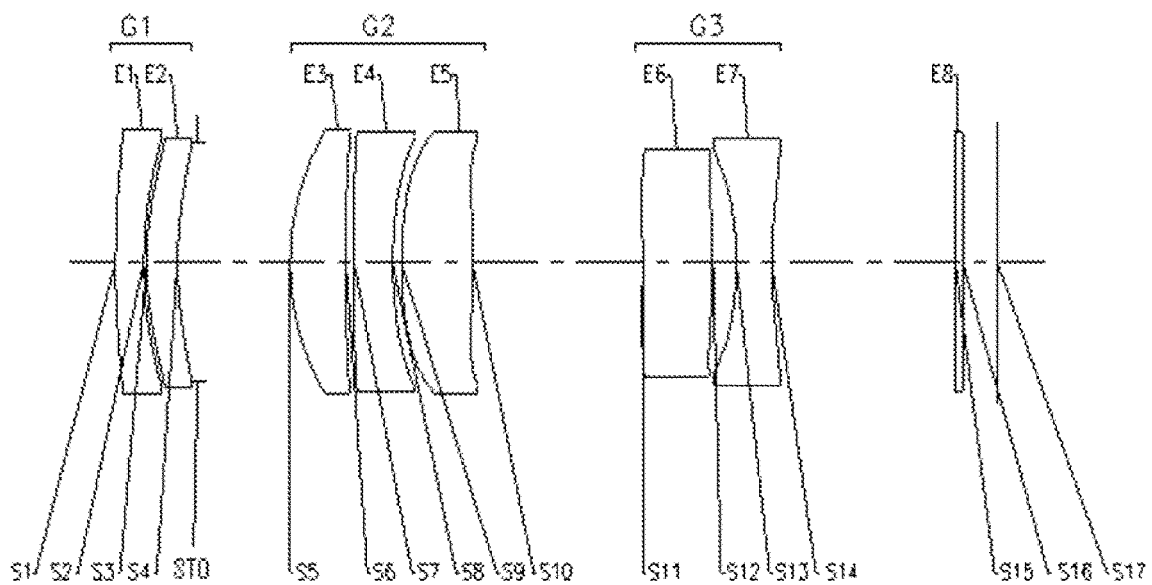
FIG. 14 shows a structure diagram of a zoom lens assembly at a middle end position according to Example 2 of the disclosure.
Figure 15:
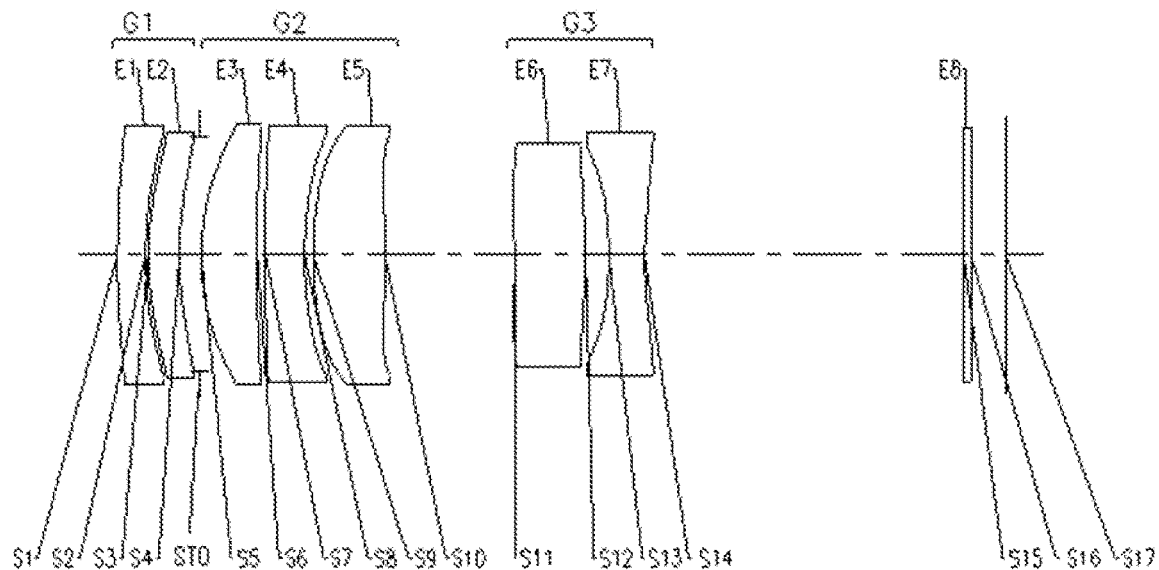
FIG. 15 shows a structure diagram of a zoom lens assembly at a telephoto end position according to Example 2 of the disclosure.

As shown in FIGS. 13-24, a zoom lens assembly according to Example 2 of the disclosure is described. In the embodiment and the following embodiments, part of descriptions similar to those about Example 1 are omitted for simplicity. FIG. 13 is a structure diagram of a zoom lens assembly at a wide-angle end position according to Example 2. FIG. 14 is a structure diagram of zoom lens assembly at a middle end position according to Example 2. FIG. 15 is a structure diagram of a zoom lens assembly at a telephoto end position according to Example 2.

As shown in FIGS. 13-15, the zoom lens assembly sequentially includes, from an object side to an image side, a first lens group G1, a diaphragm STO, a second lens group G2, a third lens group G3, an optical filter E8, and an imaging surface S17. The first lens group G1 includes a first lens E1 and a second lens E2. The second lens group G2 includes a third lens E3, a fourth lens E4, and a fifth lens E5. The third lens group G3 includes a sixth lens E6 and a seventh lens E7.

The first lens E1 has a positive refractive power or a negative refractive power, an object-side surface S1 of the first lens is a convex surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a concave surface. The fourth lens E4 has a positive refractive power or a negative refractive power, an object-side surface S7 of the fourth lens is a convex surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a convex surface. The sixth lens E6 has a positive refractive power or a negative refractive power, an object-side surface S11 of the sixth lens is a concave surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a concave surface. The optical filter E8 has an object-side surface S15 of the optical filter and an image-side surface S16 of the optical filter. Light from an object sequentially penetrates through each of the surfaces S1 to S16, and is finally imaged on the imaging surface S17.

Table 4 shows a table of basic parameters for the zoom lens assembly of Example 2, and the units of the curvature radius, the thickness/distance and the focal length are all millimeter (mm).

TABLE 4

| Surface number | Surface type | Curvature radius | Thickness | Material Refractive index | Material Abbe number | Conic coefficient |
|---|---|---|---|---|---|---|
| OBJ | Spherical | Infinite | Infinite | | | |
| S1 | Aspheric | 24.6643 | 0.8000 | 1.546 | 55.82 | 11.4772 |
| S2 | Aspheric | 10.5808 | 0.0800 | | | 0.9915 |
| S3 | Aspheric | 8.0491 | 0.8730 | 1.678 | 19.24 | −6.3232 |
| S4 | Aspheric | 8.8445 | 0.5921 | | | −8.2219 |
| STO | Spherical | Infinite | T1 | | | |
| S5 | Aspheric | 6.3911 | 1.5844 | 1.518 | 64.2 | −0.2987 |
| S6 | Aspheric | 200.0000 | 0.2286 | | | −57.3539 |
| S7 | Aspheric | 85.0499 | 1.0801 | 1.678 | 19.24 | −12.4610 |
| S8 | Aspheric | 9.2427 | 0.2510 | | | −0.2652 |
| S9 | Aspheric | 10.4363 | 2.0301 | 1.570 | 37.32 | −1.0295 |
| S10 | Aspheric | −22.7459 | T2 | | | 3.4170 |
| S11 | Aspheric | −41.2951 | 1.9839 | 1.678 | 19.24 | −47.9748 |
| S12 | Aspheric | −15.4648 | 0.6604 | | | −4.6095 |
| S13 | Aspheric | −11.6141 | 1.0000 | 1.537 | 55.82 | −69.8471 |
| S14 | Aspheric | 8.8418 | T3 | | | 3.7628 |
| S15 | Spherical | Infinite | 0.2100 | 1.518 | 64.17 | |
| S16 | Spherical | Infinite | 0.9841 | | | |
| S17 | Spherical | Infinite | | | | |

Table 5 shows parameters of the zoom lens assembly of Example 2. The units of an effective focal length f, a numerical aperture Fno, a distance T1 between the first lens group G1 and the second lens group G2, a distance T2 between the second lens group G2 and the third lens group G3 and a distance T3 between the third lens group G3 and the optical filter E8 are all millimeter (mm). FOV is a maximum field of view of the zoom lens assembly, and the unit of FOV is degree.

TABLE 5

| | f | FOV | Fno | T1 | T2 | T3 |
|---|---|---|---|---|---|---|
| Wide-angle end | 15.00 | 13.6 | 2.40 | 4.7170 | 7.3484 | 0.5768 |
| Middle end | 20.80 | 9.9 | 3.33 | 2.6145 | 4.8161 | 5.2115 |
| Telephoto end | 26.50 | 7.8 | 4.24 | 0.0250 | 3.6405 | 8.9768 |

Table 6 shows high-order coefficients that can be used for each aspheric mirror surface in Example 2. A surface type of each aspheric surface may be defined by formula (1) given in Example 1.

TABLE 6

| Surface number | A4 | A6 | A8 | A10 | A12 | A14 | A16 | A18 | A20 |
|---|---|---|---|---|---|---|---|---|---|
| S1 | −2.7412E−02 | −1.3346E−02 | 1.4555E−03 | −1.8772E−04 | 0.0000E+00 | 0.0000E+00 | 0.0000E+00 | 0.0000E+00 | 0.0000E+00 |
| S2 | 7.5506E−03 | −1.3111E−02 | 1.3372E−03 | −3.6139E−04 | 0.0000E+00 | 0.0000E+00 | 0.0000E+00 | 0.0000E+00 | 0.0000E+00 |
| S3 | −1.3842E−02 | −1.9890E−03 | 3.5340E−04 | −2.0379E−04 | 1.3725E−05 | 2.6377E−06 | 0.0000E+00 | 0.0000E+00 | 0.0000E+00 |
| S4 | −4.8569E−02 | 4.3233E−04 | 7.8422E−05 | −1.3259E−05 | 8.0377E−06 | 5.9901E−06 | 0.0000E+00 | 0.0000E+00 | 0.0000E+00 |
| S5 | 2.9273E−02 | −3.5799E−03 | −2.5660E−03 | −9.6094E−04 | −1.8563E−05 | 1.1031E−05 | 0.0000E+00 | 0.0000E+00 | 0.0000E+00 |
| S6 | 8.8520E−02 | 4.9669E−04 | −6.5065E−03 | −4.7266E−04 | 4.7316E−05 | −1.4431E−04 | 0.0000E+00 | 0.0000E+00 | 0.0000E+00 |
| S7 | −2.3253E−03 | 2.4781E−02 | −4.6695E−03 | 6.4424E−04 | −4.4011E−04 | −7.9574E−05 | 0.0000E+00 | 0.0000E+00 | 0.0000E+00 |
| S8 | 1.9016E−02 | 3.7800E−02 | −6.1240E−03 | −8.6551E−04 | −9.7489E−04 | 2.9827E−04 | 0.0000E+00 | 0.0000E+00 | 0.0000E+00 |
| S9 | 3.3687E−01 | 5.0838E−02 | −34176E−03 | −1.0864E−03 | −4.0592E−04 | 4.4255E−04 | −4.6547E−05 | −1.4077E−05 | 0.0000E+00 |
| S10 | 2.9607E−01 | 3.4192E−02 | 5.6197E−03 | 6.3685E−04 | 0.0000E+00 | 0.0000E+00 | 0.0000E+00 | 0.0000E+00 | 0.0000E+00 |
| S11 | 1.5669E−01 | 2.6797E−03 | 3.5983E−04 | −3.3798E−05 | 0.0000E+00 | 0.0000E+00 | 0.0000E+00 | 0.0000E+00 | 0.0000E+00 |
| S12 | 1.4154E−01 | 7.8971E−03 | 1.9265E−03 | 7.5272E−04 | 0.0000E+00 | 0.0000E+00 | 0.0000E+00 | 0.0000E+00 | 0.0000E+00 |
| S13 | −4.4723E−01 | 4.5791E−02 | −5.2809E−03 | 2.5318E−03 | −5.7978E−04 | 5.2544E−05 | 0.0000E+00 | 0.0000E+00 | 0.0000E+00 |
| S14 | −4.7555E−01 | 3.1722E−02 | −7.6952E−03 | 1.3207E−03 | −6.5258E−04 | 7.8535E−05 | 0.0000E+00 | 0.0000E+00 | 0.0000E+00 |

Figure 16:
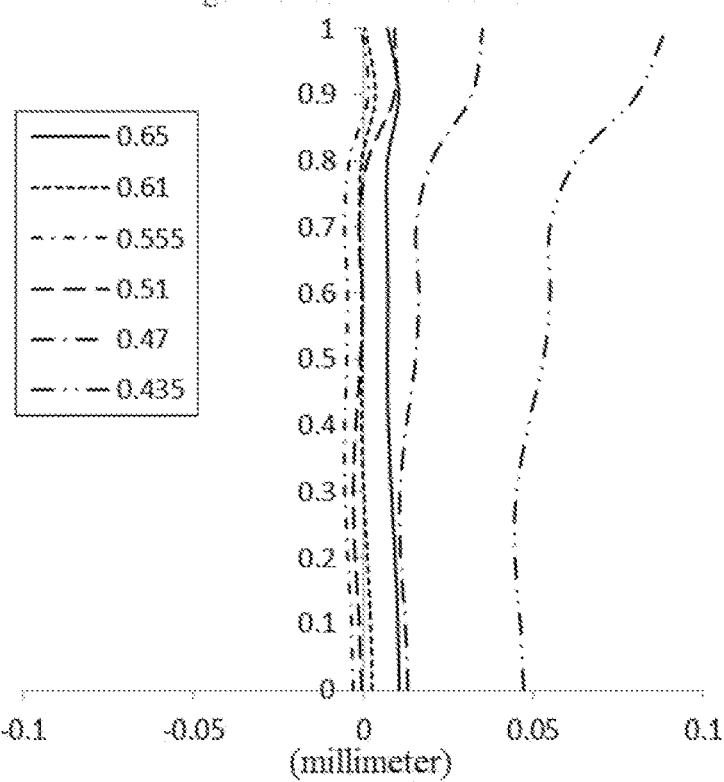
FIGS. 16-18 show a longitudinal aberration curve, an astigmatism curve and a distortion curve of the zoom lens assembly in FIG. 13 respectively.
Figure 17:
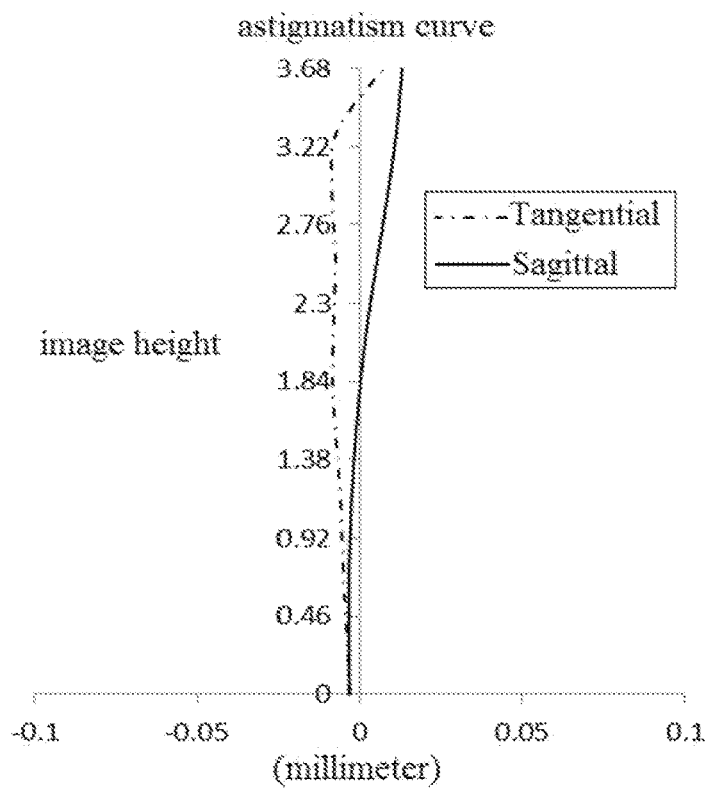
Figure 18:
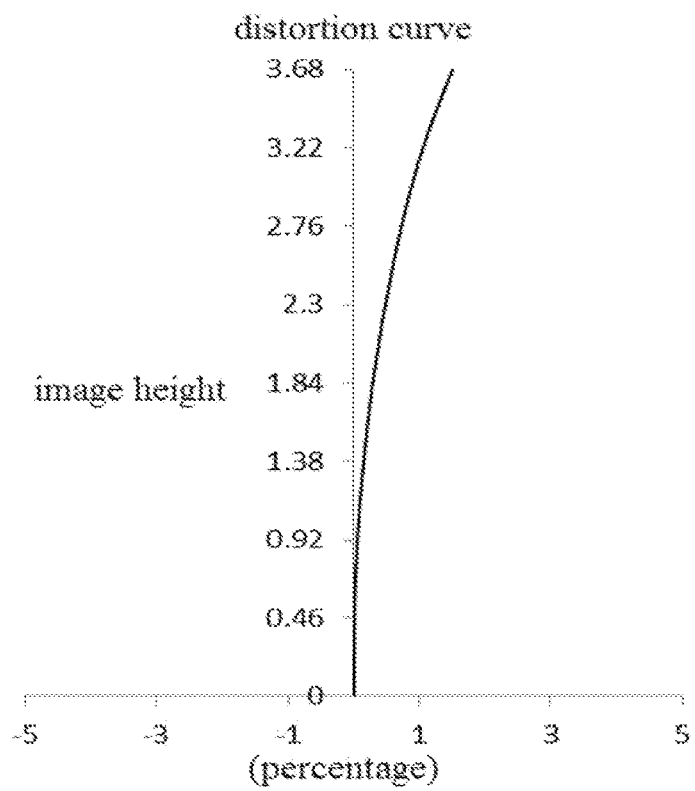

FIG. 16 shows a longitudinal aberration curve of the wide-angle end of the zoom lens assembly according to Example 2 to represent deviations of a convergence focal point after light of different wavelengths passes through the zoom lens assembly. FIG. 17 shows an astigmatism curve of the wide-angle end of the zoom lens assembly according to Example 2 to represent a tangential image surface curvature and a sagittal image surface curvature. FIG. 18 shows a distortion curve of the wide-angle end of the zoom lens assembly according to Example 2 to represent distortion values corresponding to different fields of view.

Figure 19:
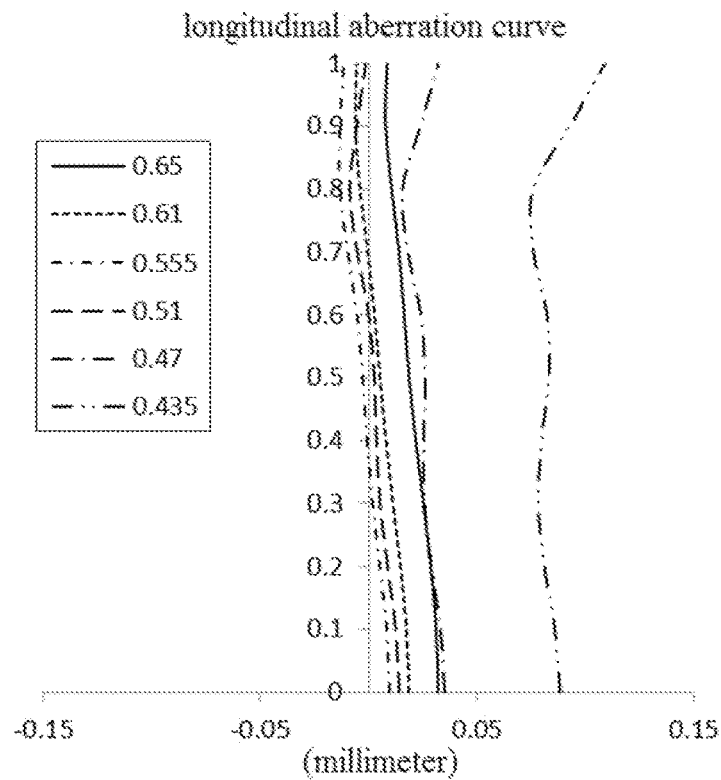
FIGS. 19-21 show a longitudinal aberration curve, an astigmatism curve and a distortion curve of the zoom lens assembly in FIG. 14 respectively.
Figure 20:
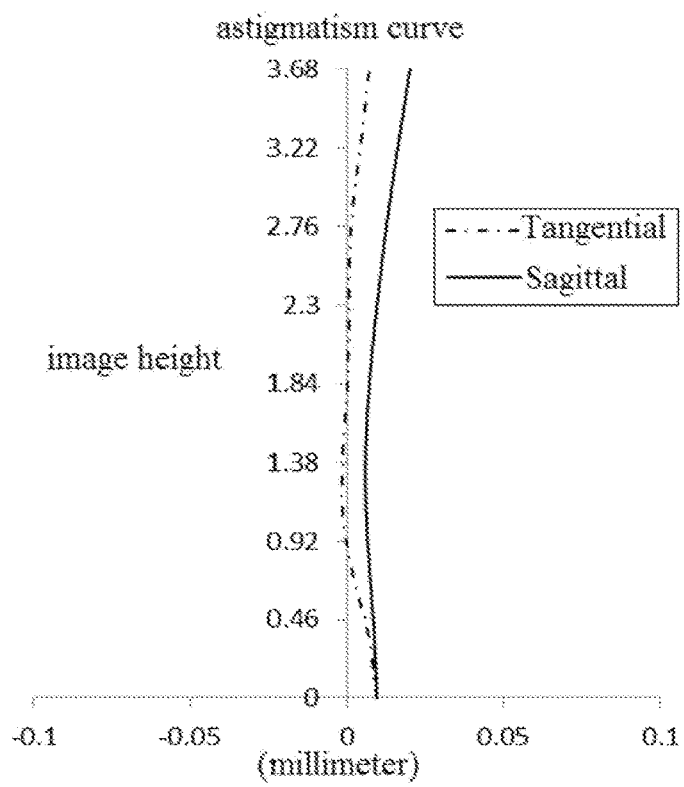
Figure 21:
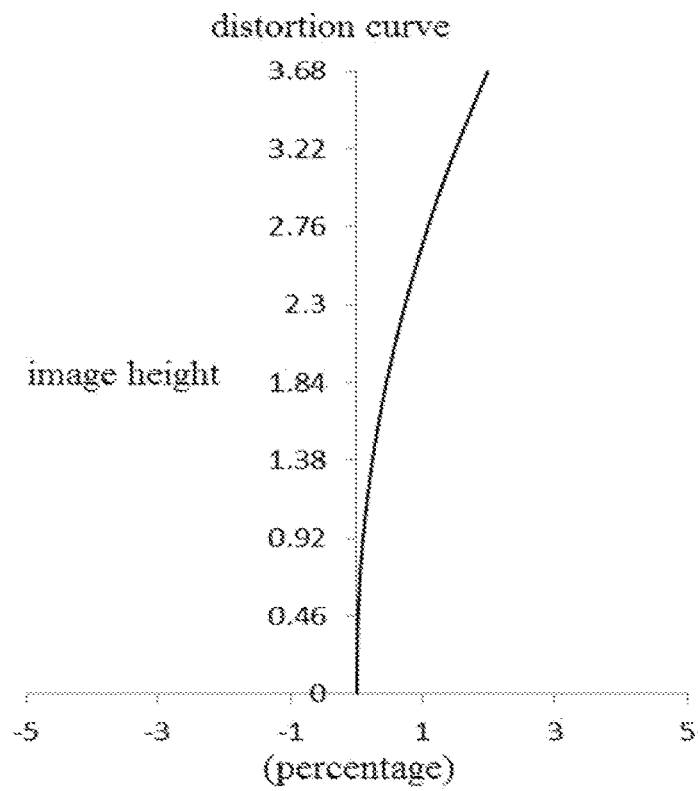

FIG. 19 shows a longitudinal aberration curve of the middle end of the zoom lens assembly according to Example 2 to represent deviations of a convergence focal point after light of different wavelengths passes through the zoom lens assembly. FIG. 20 shows an astigmatism curve of the middle end of the zoom lens assembly according to Example 2 to represent a tangential image surface curvature and a sagittal image surface curvature. FIG. 21 shows a distortion curve of the middle end of the zoom lens assembly according to Example 2 to represent distortion values corresponding to different fields of view.

Figure 22:
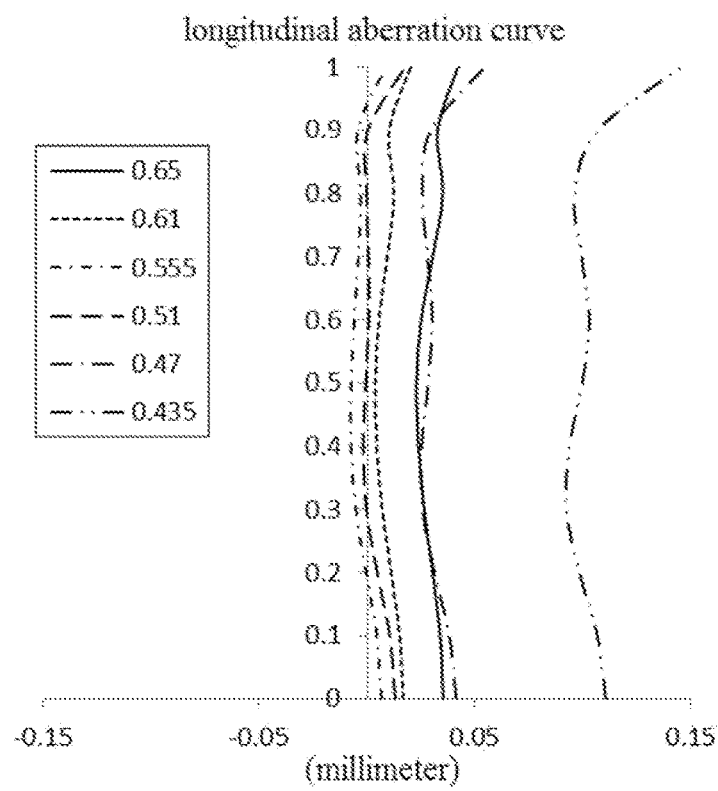
FIGS. 22-24 show a longitudinal aberration curve, an astigmatism curve and a distortion curve of the zoom lens assembly in FIG. 15 respectively.
Figure 23:
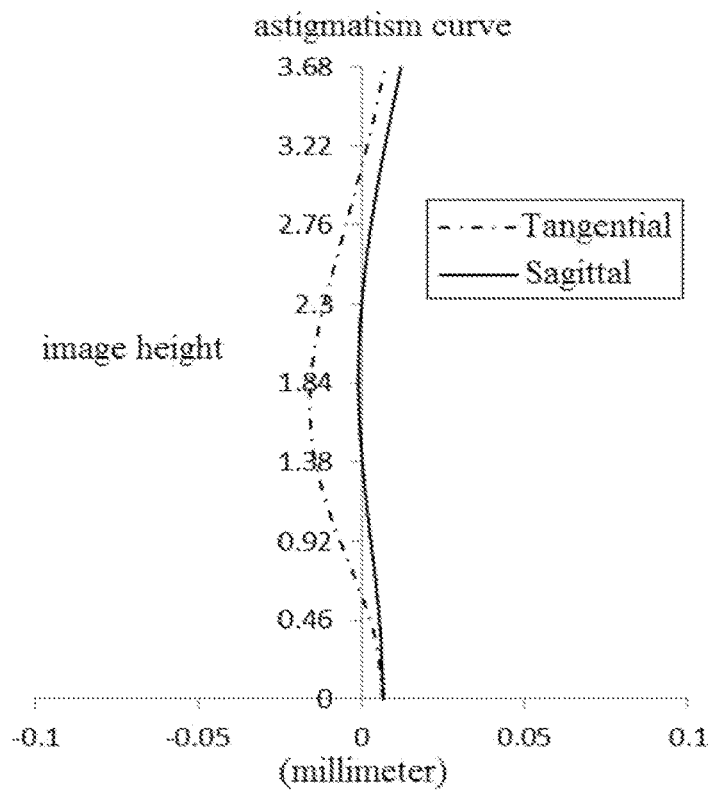
Figure 24:
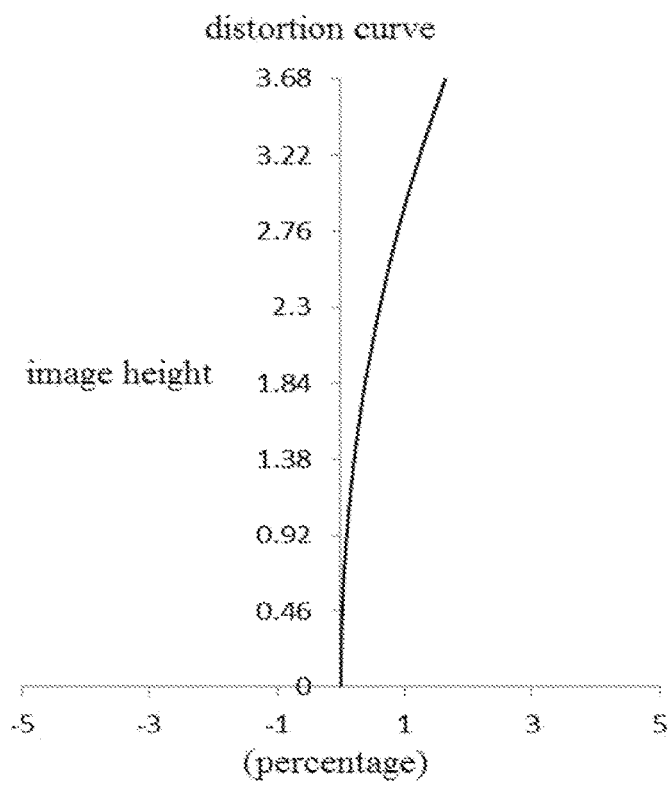

FIG. 22 shows a longitudinal aberration curve of the telephoto end of the zoom lens assembly according to Example 2 to represent deviations of a convergence focal point after light of different wavelengths passes through the zoom lens assembly. FIG. 23 shows an astigmatism curve of the telephoto end of the zoom lens assembly according to Example 2 to represent a tangential image surface curvature and a sagittal image surface curvature. FIG. 24 shows a distortion curve of the telephoto end of the zoom lens assembly according to Example 2 to represent distortion values corresponding to different fields of view.

According to FIGS. 16-24, it can be seen that the zoom lens assembly provided in Example 2 may achieve high imaging quality.

Example 3

Figure 25:
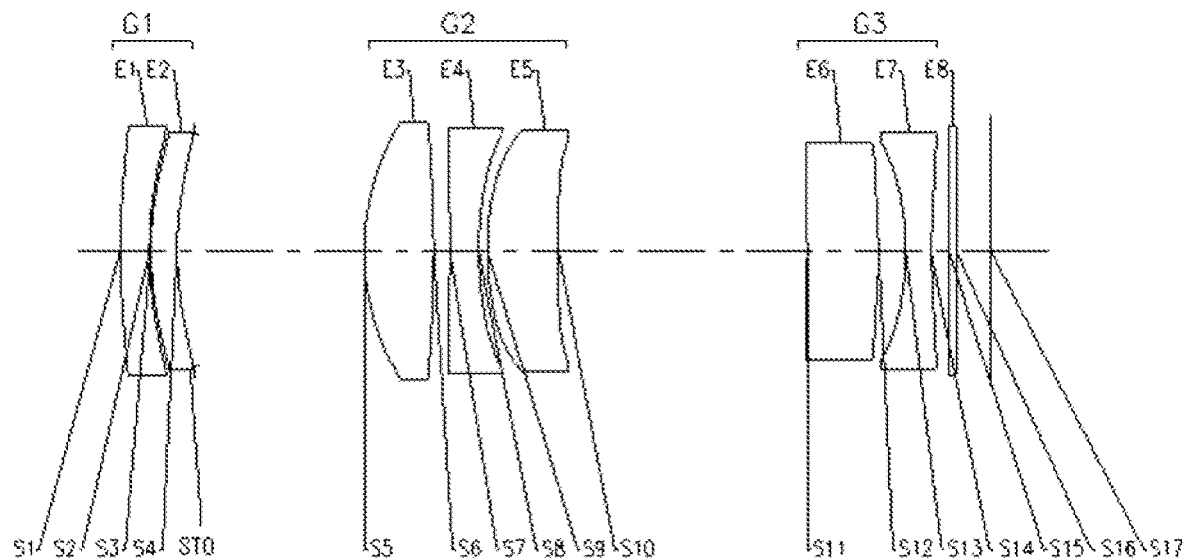
FIG. 25 shows a structure diagram of a zoom lens assembly at a wide-angle end position according to Example 3 of the disclosure.
Figure 26:
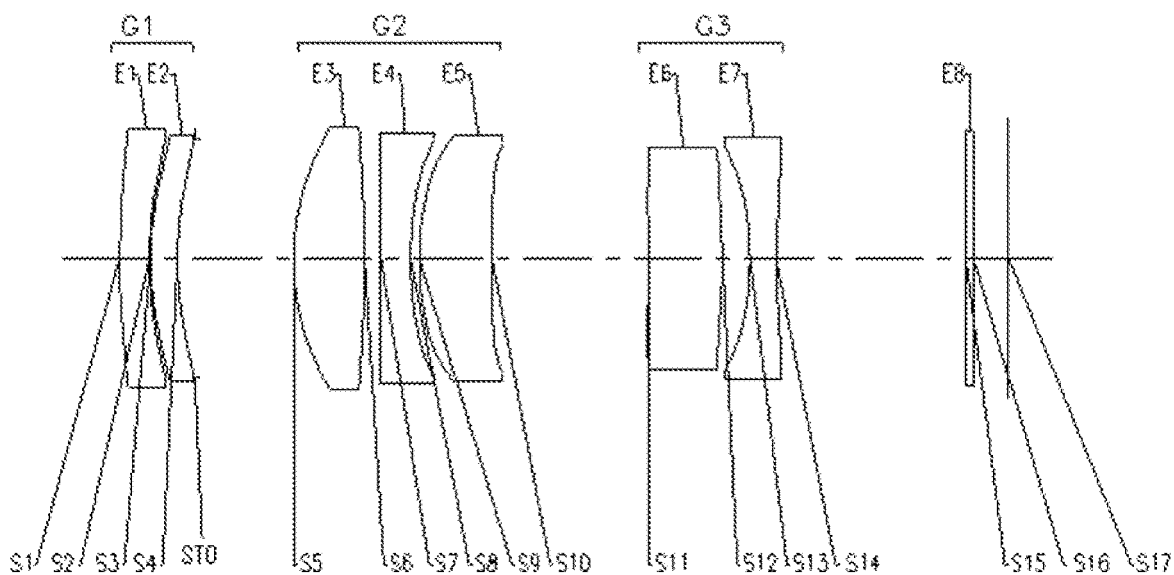
FIG. 26 shows a structure diagram of a zoom lens assembly at a middle end position according to Example 3 of the disclosure.
Figure 27:
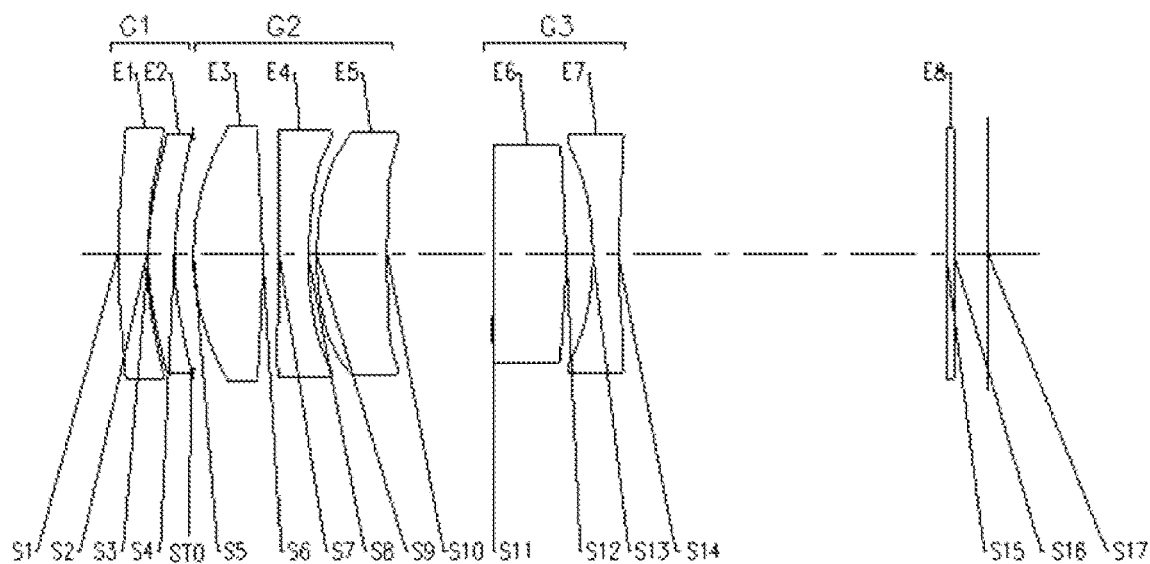
FIG. 27 shows a structure diagram of a zoom lens assembly at a telephoto end position according to Example 3 of the disclosure.

As shown in FIGS. 25-36, a zoom lens assembly according to Example 3 of the disclosure is described. In the embodiment and the following embodiments, part of descriptions similar to those about Example 1 are omitted for simplicity. FIG. 25 is a structure diagram of a wide-angle end of a zoom lens assembly according to Example 3. FIG. 26 is a structure diagram of a middle end of a zoom lens assembly according to Example 3. FIG. 27 is a structure diagram of a telephoto end of a zoom lens assembly according to Example 3.

As shown in FIGS. 25-27, the zoom lens assembly sequentially includes, from an object side to an image side, a first lens group G1, a diaphragm STO, a second lens group G2, a third lens group G3, an optical filter E8, and an imaging surface S17. The first lens group G1 includes a first lens E1 and a second lens E2. The second lens group G2 includes a third lens E3, a fourth lens E4, and a fifth lens E5. The third lens group G3 includes a sixth lens E6 and a seventh lens E7.

The first lens E1 has a positive refractive power or a negative refractive power, an object-side surface S1 of the first lens is a convex surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a convex surface. The fourth lens E4 has a positive refractive power or a negative refractive power, an object-side surface S7 of the fourth lens is a concave surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a concave surface. The sixth lens E6 has a positive refractive power or a negative refractive power, an object-side surface S11 of the sixth lens is a concave surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a concave surface. The optical filter E8 has an object-side surface S15 of the optical filter and an image-side surface S16 of the optical filter. Light from an object sequentially penetrates through each of the surfaces S1 to S16, and is finally imaged on the imaging surface S17.

Table 7 shows a table of basic parameters for the zoom lens assembly of Example 3, and the units of the curvature radius, the thickness/distance and the focal length are all millimeter (mm).

TABLE 7

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspheric | 20.5514 | 0.8116 | 1.546 | 55.82 | 1.3209 |
| S2 | Aspheric | 11.7463 | 0.0300 | | | 1.1702 |
| S3 | Aspheric | 8.2079 | 0.7242 | 1.678 | 19.24 | −6.1345 |
| S4 | Aspheric | 8.1403 | 0.5027 | | | −7.9579 |
| STO | Spherical | Infinite | 4.7057 | | | |
| S5 | Aspheric | 6.3733 | 1.9285 | 1.518 | 64.2 | −0.4235 |
| S6 | Aspheric | −37.7392 | 0.4420 | | | 90.4270 |
| S7 | Aspheric | −239.2761 | 0.8007 | 1.645 | 23.54 | −99.0000 |
| S8 | Aspheric | 8.9283 | 0.2420 | | | 0.8503 |
| S9 | Aspheric | 8.3338 | 1.9711 | 1.570 | 37.32 | −0.5648 |
| S10 | Aspheric | 20613.1183 | 6.9069 | | | −99.0000 |
| S11 | Aspheric | −27.2310 | 2.0000 | 1.678 | 19.24 | −39.9238 |
| S12 | Aspheric | −12.5726 | 0.7427 | | | −9.6930 |
| S13 | Aspheric | −9.1131 | 0.7000 | 1.537 | 55.82 | −99.0000 |
| S14 | Aspheric | 11.6674 | 0.4942 | | | 8.6090 |
| S15 | Spherical | Infinite | 0.2100 | 1.518 | 64.17 | |
| S16 | Spherical | Infinite | 0.9574 | | | |
| S17 | Spherical | Infinite | | | | |

Table 8 shows parameters of the zoom lens assembly of Example 3. The units of an effective focal length f, a numerical aperture Fno, a distance T1 between the first lens group G1 and the second lens group G2, a distance T2 between the second lens group G2 and the third lens group G3 and a distance T3 between the third lens group G3 and the optical filter E8 are all millimeter (mm). FOV is a maximum field of view of the zoom lens assembly, and the unit of FOV is degree.

TABLE 8

| | f | FOV | Fno | T1 | T2 | T3 |
|---|---|---|---|---|---|---|
| Wide-angle end | 15.20 | 13.4 | 2.40 | 4.7057 | 6.9069 | 0.4942 |
| Middle end | 20.81 | 9.8 | 3.29 | 2.6663 | 4.2740 | 5.1716 |
| Telephoto end | 26.50 | 7.8 | 4.18 | 0.0250 | 2.9642 | 9.1128 |

Table 9 shows high-order coefficients that can be used for each aspheric mirror surface in Example 3. A surface type of each aspheric surface may be defined by formula (1) given in Example 1.

TABLE 9

| Surface number | A4 | A6 | A8 | A10 | A12 | A14 | A16 | A18 | A20 |
|---|---|---|---|---|---|---|---|---|---|
| S1 | −5.3288E−02 | −1.2579E−02 | 1.9420E−03 | −1.9338E−04 | −1.0225E−04 | 7.6311E−05 | 0.0000E+00 | 0.0000E+00 | 0.0000E+00 |
| S2 | 1.3373E−03 | −1.7971E−02 | 3.9516E−03 | −8.6733E−04 | 2.4019E−04 | 1.8084E−04 | 0.0000E+00 | 0.0000E+00 | 0.0000E+00 |
| S3 | −1.3696E−02 | −1.6864E−03 | 1.1567E−03 | −6.1267E−04 | 4.1626E−04 | 9.3421E−05 | 0.0000E+00 | 0.0000E+00 | 0.0000E+00 |
| S4 | −4.1350E−02 | 2.2748E−03 | −5.0329E−04 | −4.8426E−05 | 1.3875E−04 | −2.7264E−06 | 0.0000E+00 | 0.0000E+00 | 0.0000E+00 |
| S5 | 9.7959E−03 | 6.4625E−04 | −1.1427E−03 | −2.5319E−04 | 0.0000E+00 | 0.0000E+00 | 0.0000E+00 | 0.0000E+00 | 0.0000E+00 |
| S6 | 4.1606E−02 | 1.5651E−02 | −3.8508E−03 | 1.9470E−04 | 0.0000E+00 | 0.0000E+00 | 0.0000E+00 | 0.0000E+00 | 0.0000E+00 |
| S7 | −1.1731E−02 | 3.1048E−02 | −7.1312E−03 | −7.1577E−04 | 2.4904E−04 | −1.1870E−04 | 0.0000E+00 | 0.0000E+00 | 0.0000E+00 |
| S8 | 3.6335E−02 | 4.1304E−02 | −7.0253E−03 | −5.0416E−03 | 1.2183E−03 | −1.4919E−04 | 0.0000E+00 | 0.0000E+00 | 0.0000E+00 |
| S9 | 2.7375E−01 | 3.8435E−02 | −3.8419E−03 | 4.6229E−03 | 1.4502E−03 | −2.2154E−04 | −2.3565E−05 | 9.0348E−06 | 0.0000E+00 |
| S10 | 2.5916E−01 | 1.9866E−02 | 2.0675E−03 | −4.5871E−04 | −1.4189E−04 | −3.5930E−05 | 0.0000E+00 | 0.0000E+00 | 0.0000E+00 |
| S11 | 1.3897E−01 | −1.8790E−03 | −1.0145E−03 | −3.1179E−04 | −1.3860E−04 | −1.6173E−05 | −3.5298E−05 | −1.3509E−05 | 1.0396E−05 |
| S12 | 1.7121E−01 | −4.1588E−03 | −2.4334E−03 | −1.2448E−03 | −7.5167E−04 | −7.4436E−05 | −2.9353E−04 | −1.2664E−04 | 1.1256E−05 |
| S13 | −5.0053E−01 | 6.1069E−02 | −1.5939E−02 | 4.3762E−03 | −2.0067E−03 | 9.3379E−04 | −7.8589E−04 | −1.0125E−04 | −2.4011E−05 |
| S14 | −4.3362E−01 | 1.9518E−02 | −7.5957E−03 | 1.7410E−03 | 1.1280E−04 | 6.2819E−04 | −2.5867E−04 | 1.3036E−04 | 3.3662E−05 |

Figure 28:
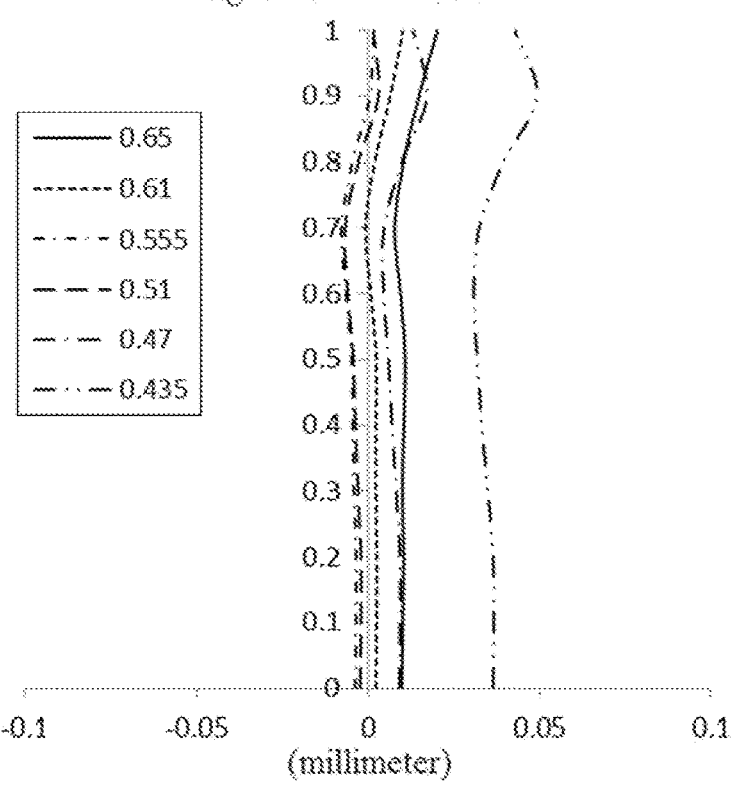
FIGS. 28-30 show a longitudinal aberration curve, an astigmatism curve and a distortion curve of the zoom lens assembly in FIG. 25 respectively.
Figure 29:
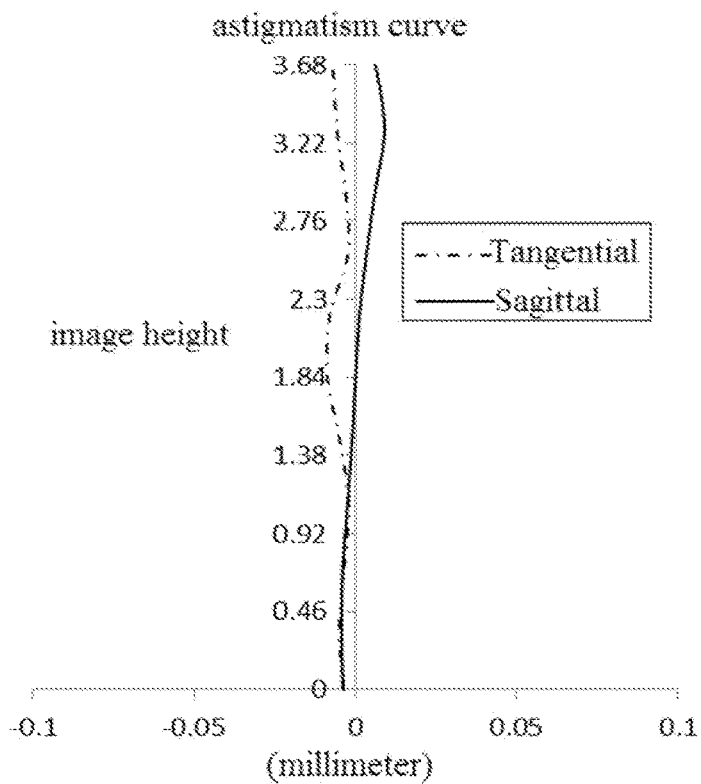
Figure 30:
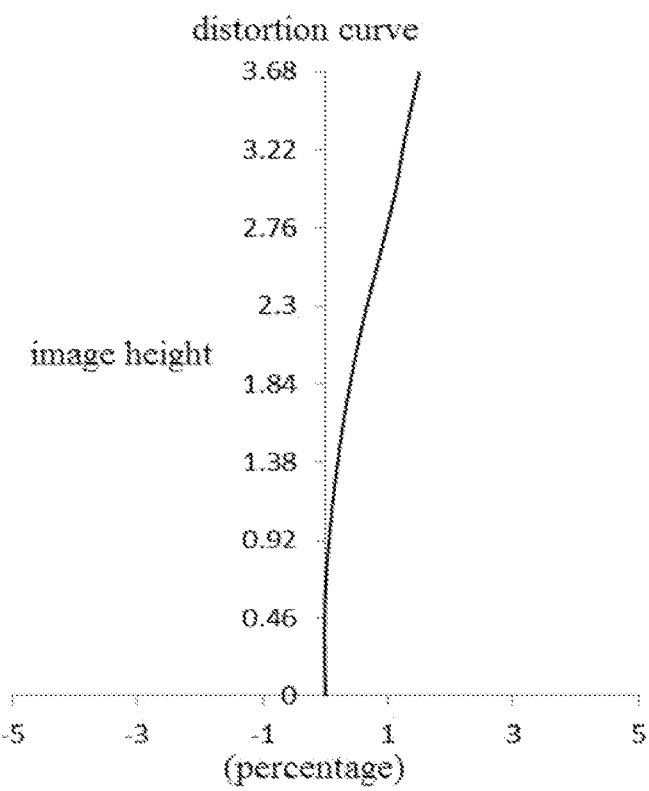

FIG. 28 shows a longitudinal aberration curve of the wide-angle end of the zoom lens assembly according to Example 3 to represent deviations of a convergence focal point after light of different wavelengths passes through the zoom lens assembly. FIG. 29 shows an astigmatism curve of the wide-angle end of the zoom lens assembly according to Example 3 to represent a tangential image surface curvature and a sagittal image surface curvature. FIG. 30 shows a distortion curve of the wide-angle end of the zoom lens assembly according to Example 3 to represent distortion values corresponding to different fields of view.

Figure 31:
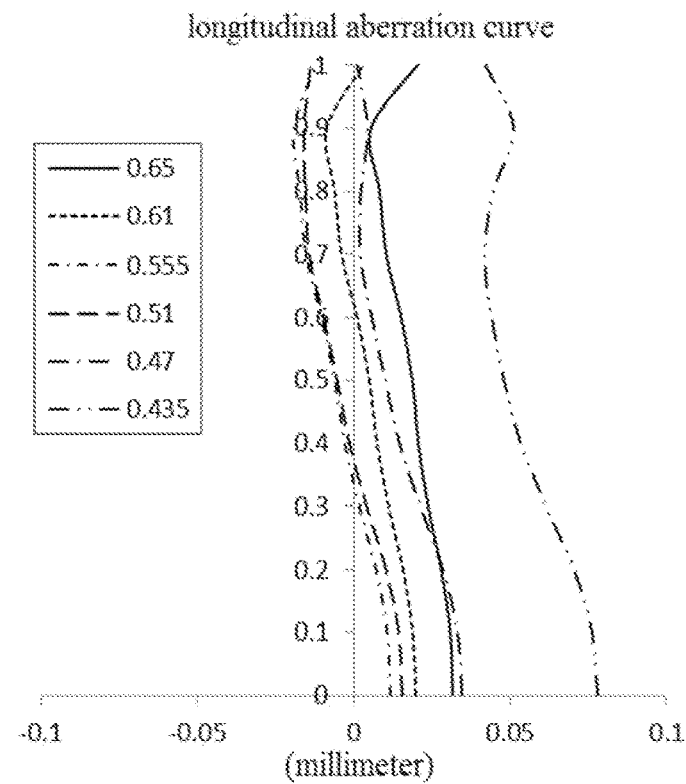
FIGS. 31-33 show a longitudinal aberration curve, an astigmatism curve and a distortion curve of the zoom lens assembly in FIG. 26 respectively.
Figure 32:
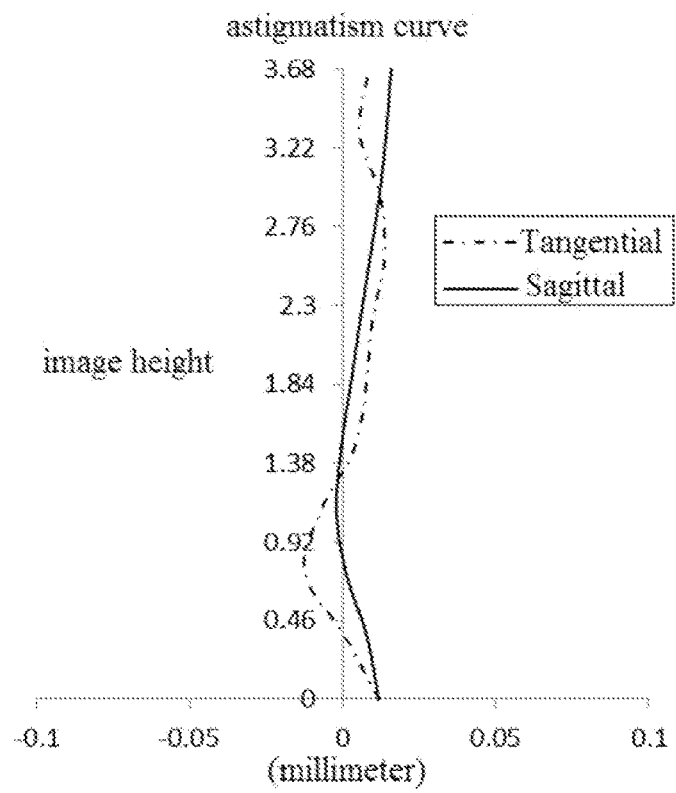
Figure 33:
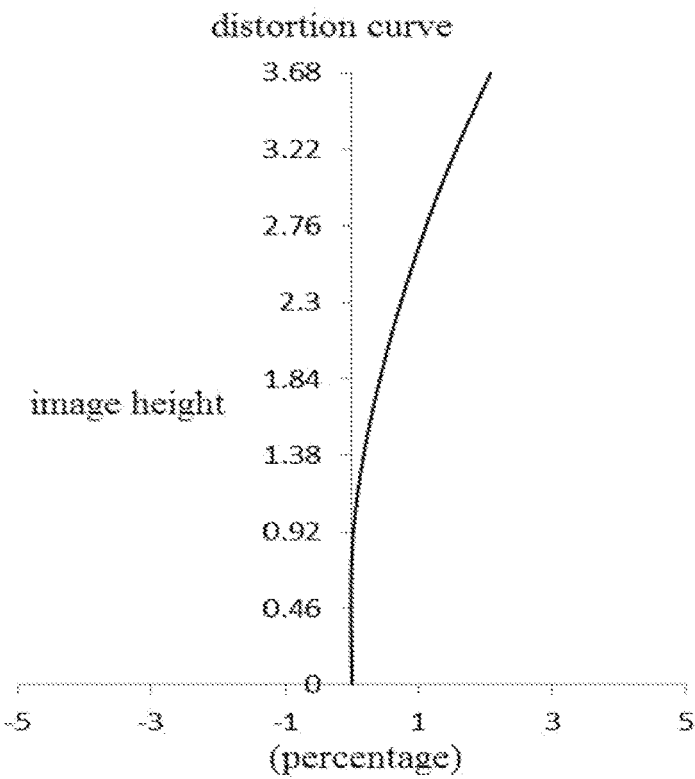

FIG. 31 shows a longitudinal aberration curve of the middle end of the zoom lens assembly according to Example 3 to represent deviations of a convergence focal point after light of different wavelengths passes through the zoom lens assembly. FIG. 32 shows an astigmatism curve of the middle end of the zoom lens assembly according to Example 3 to represent a tangential image surface curvature and a sagittal image surface curvature. FIG. 33 shows a distortion curve of the middle end of the zoom lens assembly according to Example 3 to represent distortion values corresponding to different fields of view.

Figure 34:
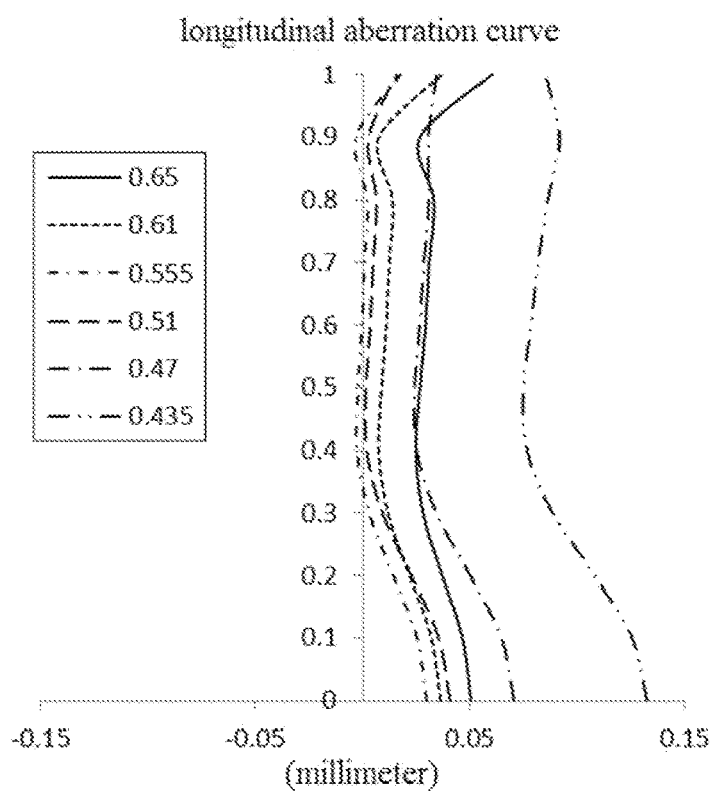
FIGS. 34-36 show a longitudinal aberration curve, an astigmatism curve and a distortion curve of the zoom lens assembly in FIG. 27 respectively.
Figure 35:
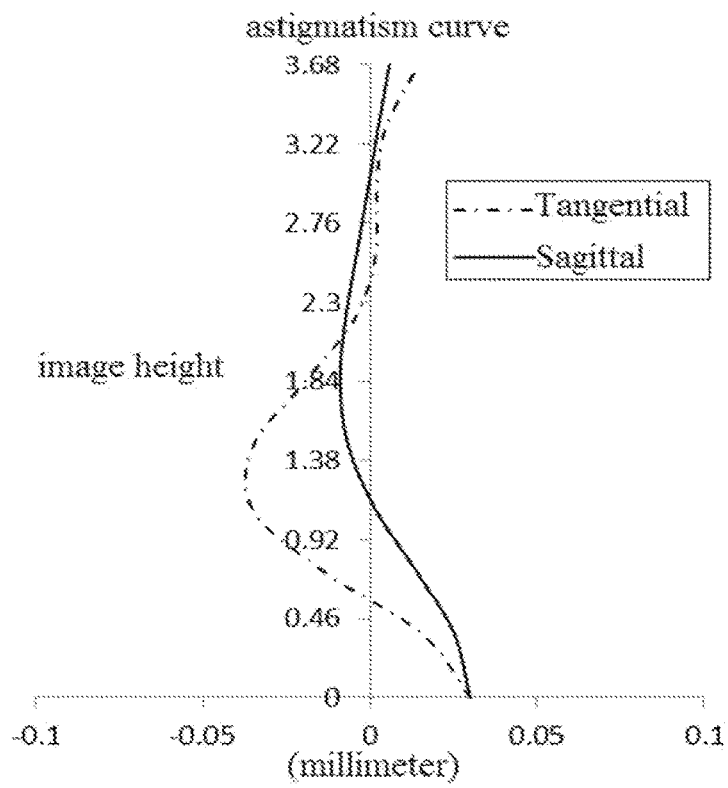
Figure 36:
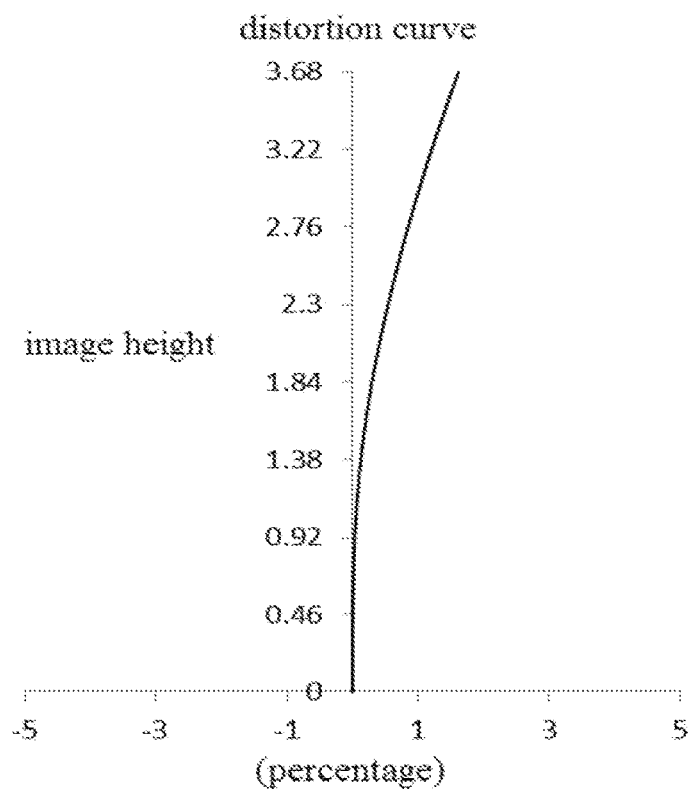

FIG. 34 shows a longitudinal aberration curve of the telephoto end of the zoom lens assembly according to Example 3 to represent deviations of a convergence focal point after light of different wavelengths passes through the zoom lens assembly. FIG. 35 shows an astigmatism curve of the telephoto end of the zoom lens assembly according to Example 3 to represent a tangential image surface curvature and a sagittal image surface curvature. FIG. 36 shows a distortion curve of the telephoto end of the zoom lens assembly according to Example 3 to represent distortion values corresponding to different fields of view.

According to FIGS. 28-36, it can be seen that the zoom lens assembly provided in Example 3 may achieve high imaging quality.

Example 4

Figure 37:
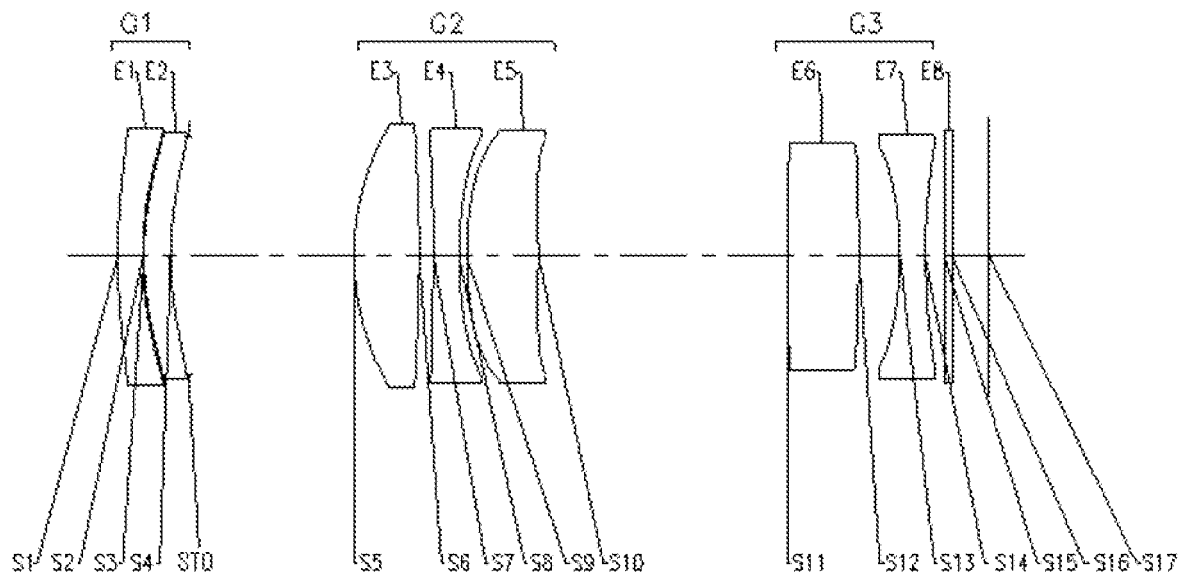
FIG. 37 shows a structure diagram of a zoom lens assembly at a wide-angle end position according to Example 4 of the disclosure.
Figure 38:
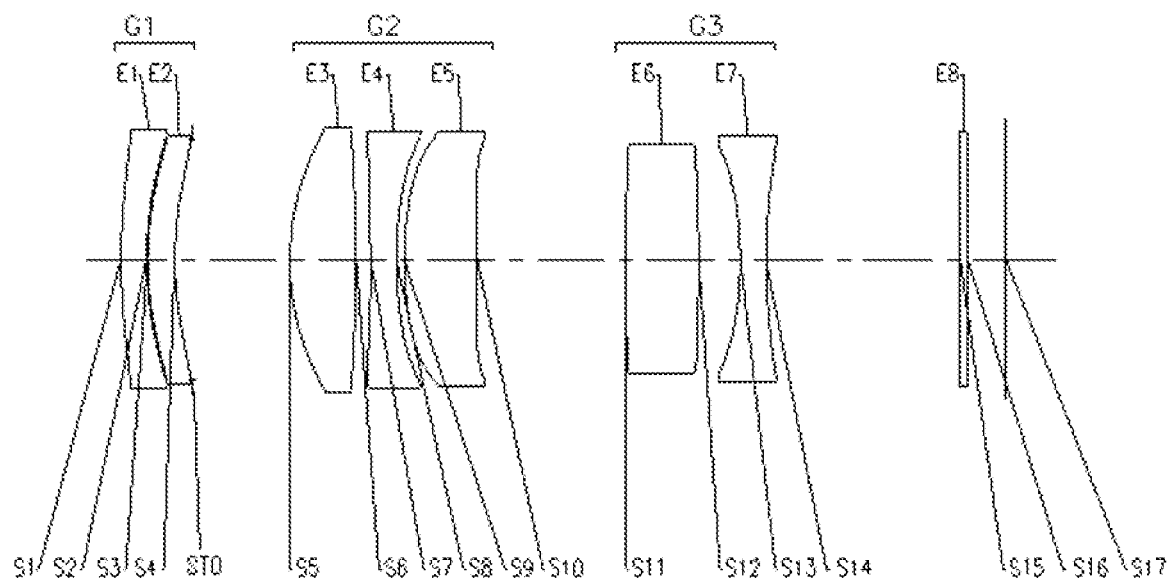
FIG. 38 shows a structure diagram of a zoom lens assembly at a middle end position according to Example 4 of the disclosure.
Figure 39:
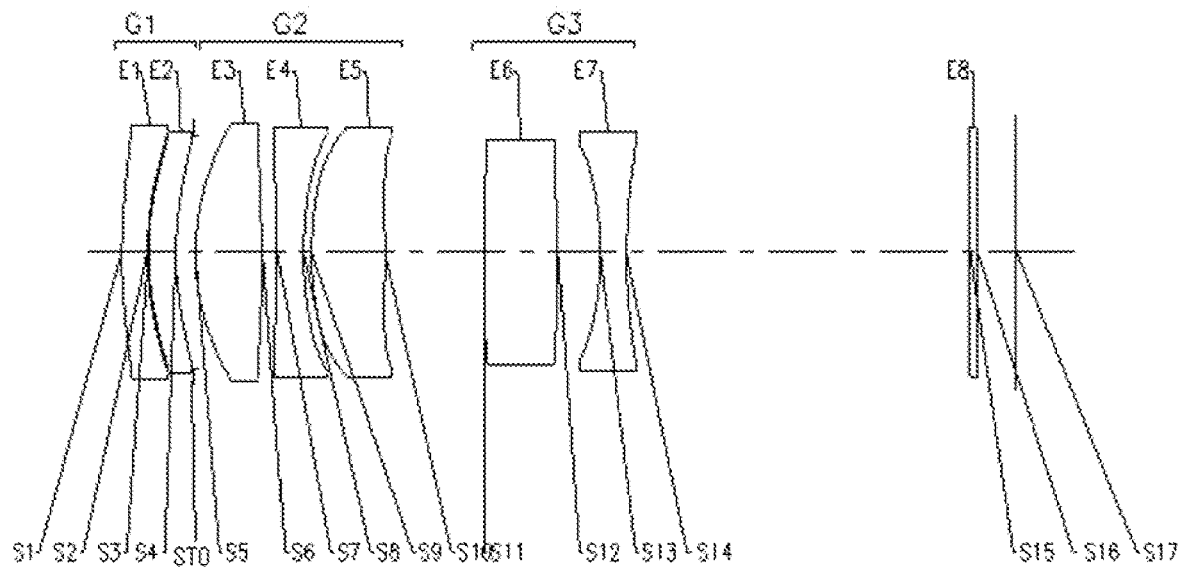
FIG. 39 shows a structure diagram of a zoom lens assembly at a telephoto end position according to Example 4 of the disclosure.

As shown in FIGS. 37-48, a zoom lens assembly according to Example 4 of the disclosure is described. In the embodiment and the following embodiments, part of descriptions similar to those about Example 1 are omitted for simplicity. FIG. 37 is a structure diagram of a wide-angle end of a zoom lens assembly according to Example 4. FIG. 38 is a structure diagram of a middle end of a zoom lens assembly according to Example 4. FIG. 39 is a structure diagram of a telephoto end of a zoom lens assembly according to Example 4.

As shown in FIGS. 37-39, the zoom lens assembly sequentially includes, from an object side to an image side, a first lens group G1, a diaphragm STO, a second lens group G2, a third lens group G3, an optical filter E8, and an imaging surface S17. The first lens group G1 includes a first lens E1 and a second lens E2. The second lens group G2 includes a third lens E3, a fourth lens E4, and a fifth lens E5. The third lens group G3 includes a sixth lens E6 and a seventh lens E7.

The first lens E1 has a positive refractive power or a negative refractive power, an object-side surface S1 of the first lens is a convex surface, and an image-side surface S2 of the first lens is a concave surface. The second lens E2 has a positive refractive power or a negative refractive power, an object-side surface S3 of the second lens is a convex surface, and an image-side surface S4 of the second lens is a concave surface. The third lens E3 has a positive refractive power or a negative refractive power, an object-side surface S5 of the third lens is a convex surface, and an image-side surface S6 of the third lens is a convex surface. The fourth lens E4 has a positive refractive power or a negative refractive power, an object-side surface S7 of the fourth lens is a concave surface, and an image-side surface S8 of the fourth lens is a concave surface. The fifth lens E5 has a positive refractive power or a negative refractive power, an object-side surface S9 of the fifth lens is a convex surface, and an image-side surface S10 of the fifth lens is a convex surface. The sixth lens E6 has a positive refractive power or a negative refractive power, an object-side surface S11 of the sixth lens is a convex surface, and an image-side surface S12 of the sixth lens is a convex surface. The seventh lens E7 has a positive refractive power or a negative refractive power, an object-side surface S13 of the seventh lens is a concave surface, and an image-side surface S14 of the seventh lens is a concave surface. The optical filter E8 has an object-side surface S15 of the optical filter and an image-side surface S16 of the optical filter. Light from an object sequentially penetrates through each of the surfaces S1 to S16, and is finally imaged on the imaging surface S17.

Table 10 shows a table of basic parameters for the zoom lens assembly of Example 4, and the units of the curvature radius, the thickness/distance and the focal length are all millimeter (mm)=

TABLE 10

| Surface number | Surface type | Curvature radius | Thickness | Material Refractive index | Abbe number | Conic coefficient |
|---|---|---|---|---|---|---|
| OBJ | Spherical | Infinite | Infinite | | | |
| S1 | Aspheric | 16.5440 | 0.7000 | 1.546 | 55.82 | 3.7101 |
| S2 | Aspheric | 9.6936 | 0.0250 | | | 0.8964 |
| S3 | Aspheric | 7.6744 | 0.7453 | 1.678 | 19.24 | −5.9664 |
| S4 | Aspheric | 7.8006 | 0.5057 | | | −8.2167 |
| STO | Spherical | Infinite | 4.6023 | | | |
| S5 | Aspheric | 6.3537 | 1.8259 | 1.518 | 64.2 | −0.4062 |
| S6 | Aspheric | −38.5789 | 0.3994 | | | 92.4394 |
| S7 | Aspheric | −60.3124 | 0.7000 | 1.645 | 23.54 | 48.3876 |
| S8 | Aspheric | 9.2695 | 0.2210 | | | 0.7438 |
| S9 | Aspheric | 9.5848 | 2.0000 | 1.570 | 37.32 | −0.2743 |
| S10 | Aspheric | −39.0893 | 6.9313 | | | −37.3483 |
| S11 | Aspheric | 1000.0000 | 2.0000 | 1.678 | 19.24 | 99.9900 |
| S12 | Aspheric | −32.3946 | 1.1420 | | | 81.0109 |
| S13 | Aspheric | −10.3514 | 0.7000 | 1.537 | 55.82 | −99.0000 |
| S14 | Aspheric | 12.4474 | 0.5415 | | | 10.8892 |
| S15 | Spherical | Infinite | 0.2100 | 1.518 | 64.17 | |
| S16 | Spherical | Infinite | 1.0506 | | | |
| S17 | Spherical | Infinite | | | | |

Table 11 shows parameters of the zoom lens assembly of Example 4. The units of an effective focal length f, a numerical aperture Fno, a distance T1 between the first lens group G1 and the second lens group G2, a distance T2 between the second lens group G2 and the third lens group G3 and a distance T3 between the third lens group G3 and the optical filter E8 are all millimeter (mm). FOV is a maximum field of view of the zoom lens assembly, and the unit of FOV is degree.

TABLE 11

| | f | FOV | Fno | T1 | T2 | T3 |
|---|---|---|---|---|---|---|
| Wide-angle end | 15.20 | 13.4 | 2.40 | 4.6023 | 6.9313 | 0.5415 |
| Middle end | 20.80 | 9.8 | 3.28 | 2.6529 | 4.0884 | 5.3389 |
| Telephoto end | 26.50 | 7.8 | 4.18 | 0.0250 | 2.7038 | 9.3415 |

Table 12 shows high-order coefficients that can be used for each aspheric mirror surface in Example 4. A surface type of each aspheric surface may be defined by formula (1) given in Example 1.

TABLE 12

| Surface number | A4 | A6 | A8 | A10 | A12 | A14 | A16 | A18 | A20 |
|---|---|---|---|---|---|---|---|---|---|
| S1 | −6.8746E−02 | −1.5461E−02 | 2.9583E−03 | −4.1595E−04 | −1.1222E−04 | 6.5770E−05 | 0.0000E+00 | 0.0000E+00 | 0.0000E+00 |
| S2 | 2.4085E−03 | −1.9005E−02 | 4.6137E−03 | −1.3585E−03 | −7.5420E−05 | 2.1036E−04 | 0.0000E+00 | 0.0000E+00 | 0.0000E+00 |
| S3 | −1.0710E−02 | −1.8304E−03 | 5.7705E−04 | −8.8756E−04 | 1.6581E−04 | 1.2526E−04 | 0.0000E+00 | 0.0000E+00 | 0.0000E+00 |
| S4 | −4.7745E−02 | 7.5768E−04 | −8.1610E−04 | −7.0295E−05 | 1.2393E−04 | −4.2634E−06 | 0.0000E+00 | 0.0000E+00 | 0.0000E+00 |
| S5 | 1.0813E−02 | 1.5626E−03 | −9.9041E−04 | −5.2358E−04 | 0.0000E+00 | 0.0000E+00 | 0.0000E+00 | 0.0000E+00 | 0.0000E+00 |
| S6 | 5.2489E−02 | 1.8121E−02 | −4.3918E−03 | −5.6432E−04 | 0.0000E+00 | 0.0000E+00 | 0.0000E+00 | 0.0000E+00 | 0.0000E+00 |
| S7 | −1.0187E−02 | 3.2582E−02 | −7.8347E−03 | −9.0678E−04 | 8.1677E−05 | −9.9511E−05 | 0.0000E+00 | 0.0000E+00 | 0.0000E+00 |
| S8 | 4.2798E−02 | 4.0920E−02 | −9.2297E−03 | −5.5257E−03 | 1.4846E−03 | −1.8994E−04 | 0.0000E+00 | 0.0000E+00 | 0.0000E+00 |
| S9 | 3.2140E−01 | 4.6258E−02 | −5.1673E−03 | −5.0438E−03 | 2.1115E−03 | −3.3563E−04 | −2.8312E−05 | 5.8558E−06 | 0.0000E+00 |
| S10 | 2.7322E−01 | 2.8958E−02 | 3.6019E−03 | −1.1695E−04 | 1.1608E−05 | −2.7959E−05 | 0.0000E+00 | 0.0000E+00 | 0.0000E+00 |
| S11 | 7.9022E−02 | −4.0509E−03 | −2.0525E−03 | −2.1218E−04 | 7.4770E−05 | 6.2113E−05 | 2.1901E−05 | 1.0691E−05 | 1.0615E−06 |
| S12 | 9.2405E−02 | −1.0198E−02 | −6.4237E−03 | −9.6075E−04 | 1.0034E−04 | 2.0483E−04 | 6.9987E−05 | 4.7147E−05 | 3.7615E−06 |
| S13 | −3.9236E−01 | 3.4407E−02 | −1.9209E−02 | 7.9599E−04 | −1.7277E−03 | 2.1362E−04 | −1.2724E−04 | 1.0672E−04 | −2.8765E−05 |
| S14 | −2.4969E−01 | 6.4148E−03 | −7.5676E−03 | −3.9905E−04 | −1.2438E−03 | −3.2183E−04 | −2.3002E−04 | −8.9415E−05 | −1.1283E−04 |

Figure 40:
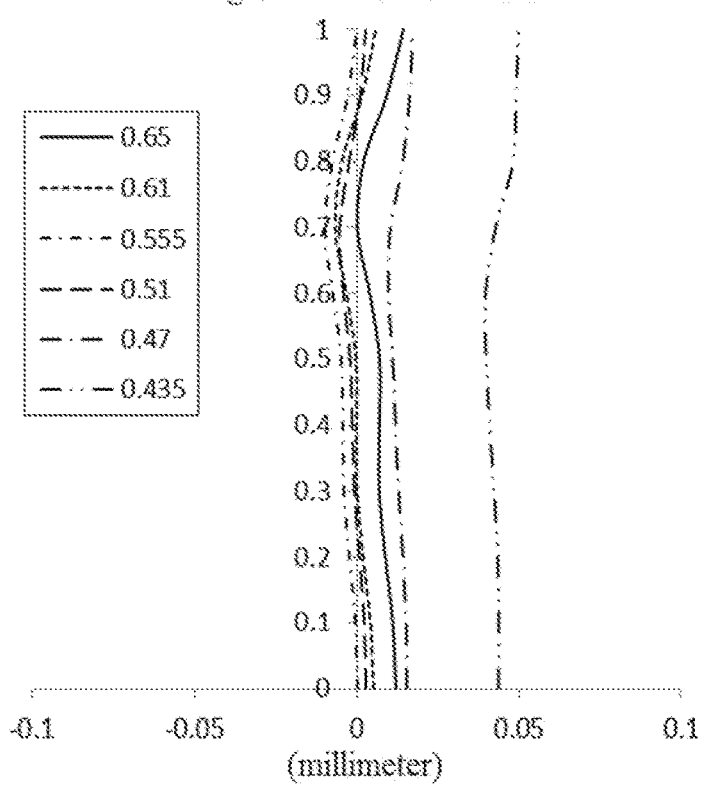
FIGS. 40-42 show a longitudinal aberration curve, an astigmatism curve and a distortion curve of the zoom lens assembly in FIG. 37 respectively.
Figure 41:
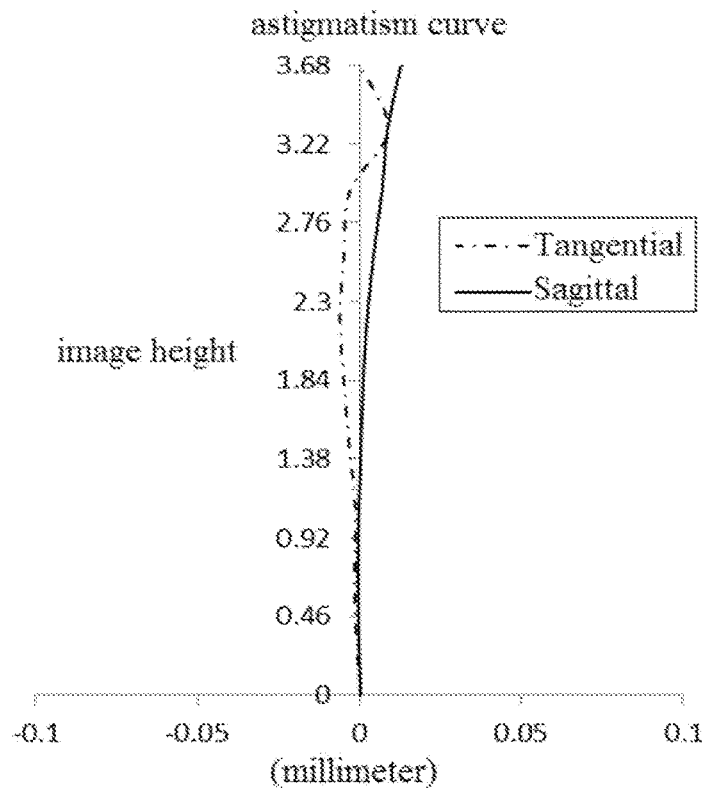
Figure 42:
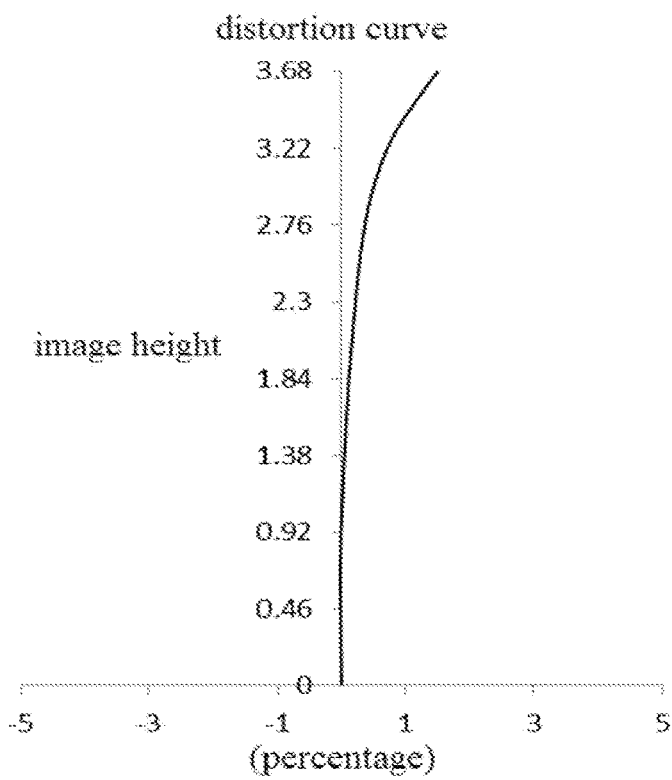

FIG. 40 shows a longitudinal aberration curve of the wide-angle end of the zoom lens assembly according to Example 4 to represent deviations of a convergence focal point after light of different wavelengths passes through the zoom lens assembly. FIG. 41 shows an astigmatism curve of the wide-angle end of the zoom lens assembly according to Example 4 to represent a tangential image surface curvature and a sagittal image surface curvature. FIG. 42 shows a distortion curve of the wide-angle end of the zoom lens assembly according to Example 4 to represent distortion values corresponding to different fields of view.

Figure 43:
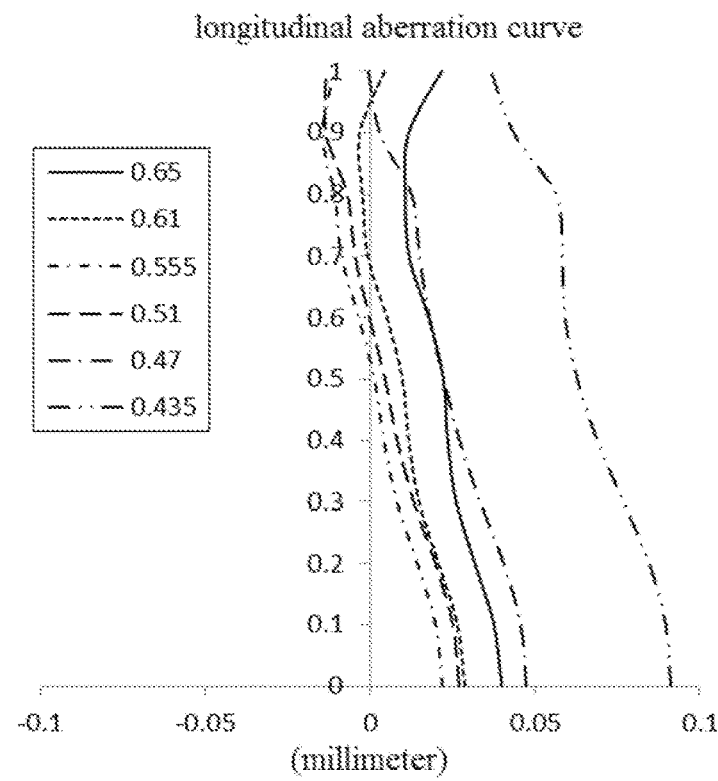
FIGS. 43-45 show a longitudinal aberration curve, an astigmatism curve and a distortion curve of the zoom lens assembly in FIG. 38 respectively.
Figure 44:
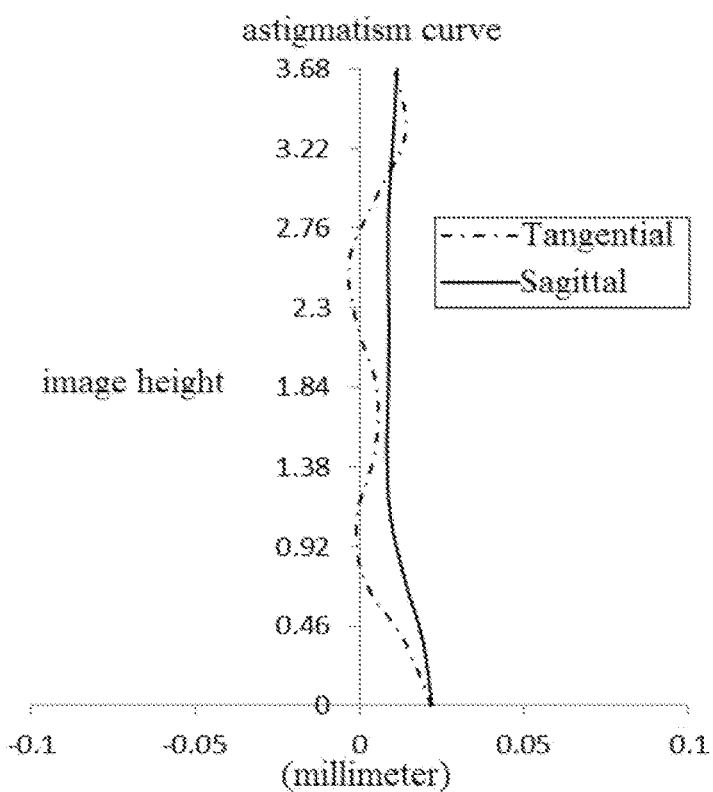
Figure 45:
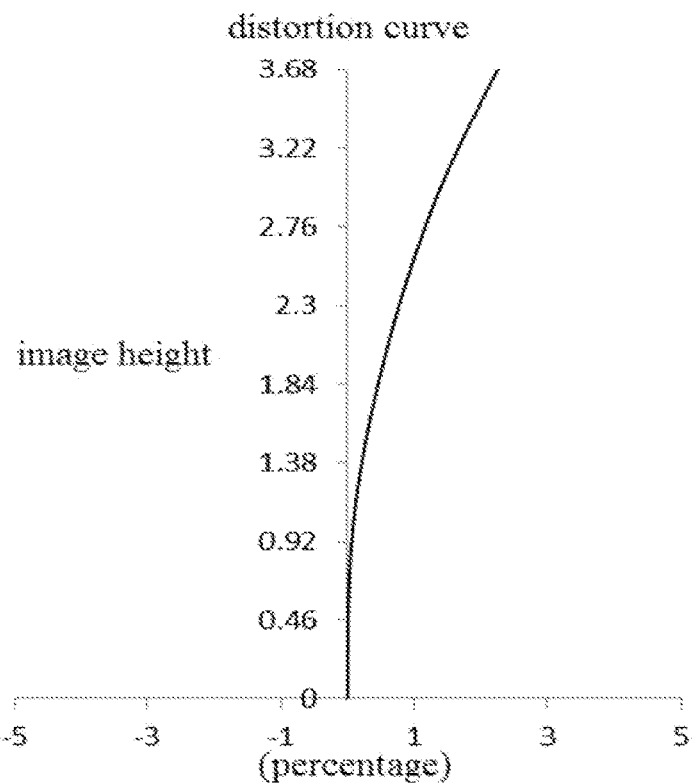

FIG. 43 shows a longitudinal aberration curve of the middle end of the zoom lens assembly according to Example 4 to represent deviations of a convergence focal point after light of different wavelengths passes through the zoom lens assembly. FIG. 44 shows an astigmatism curve of the middle end of the zoom lens assembly according to Example 4 to represent a tangential image surface curvature and a sagittal image surface curvature. FIG. 45 shows a distortion curve of the middle end of the zoom lens assembly according to Example 4 to represent distortion values corresponding to different fields of view.

Figure 46:
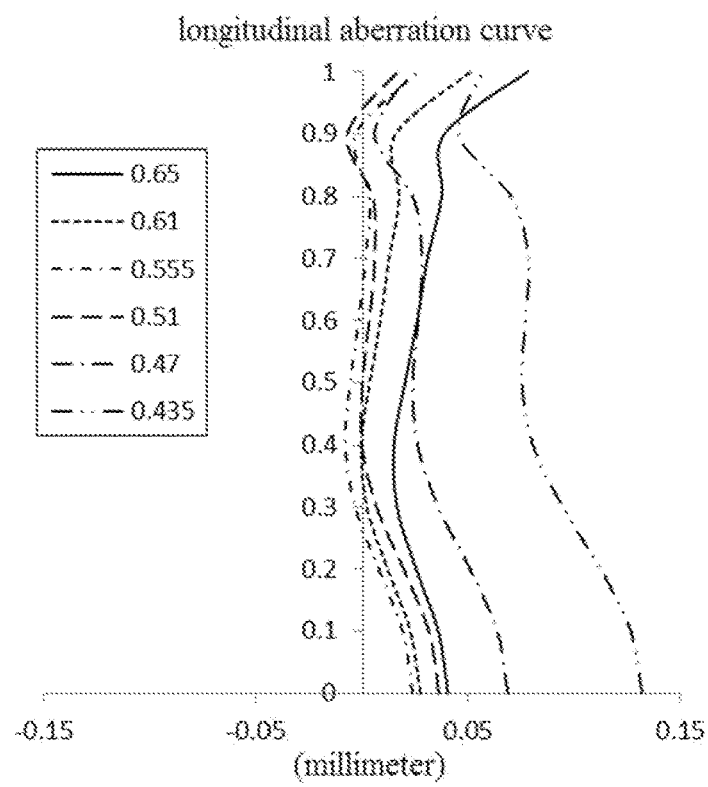
FIGS. 46-48 show a longitudinal aberration curve, an astigmatism curve and a distortion curve of the zoom lens assembly in FIG. 39 respectively.
Figure 47:
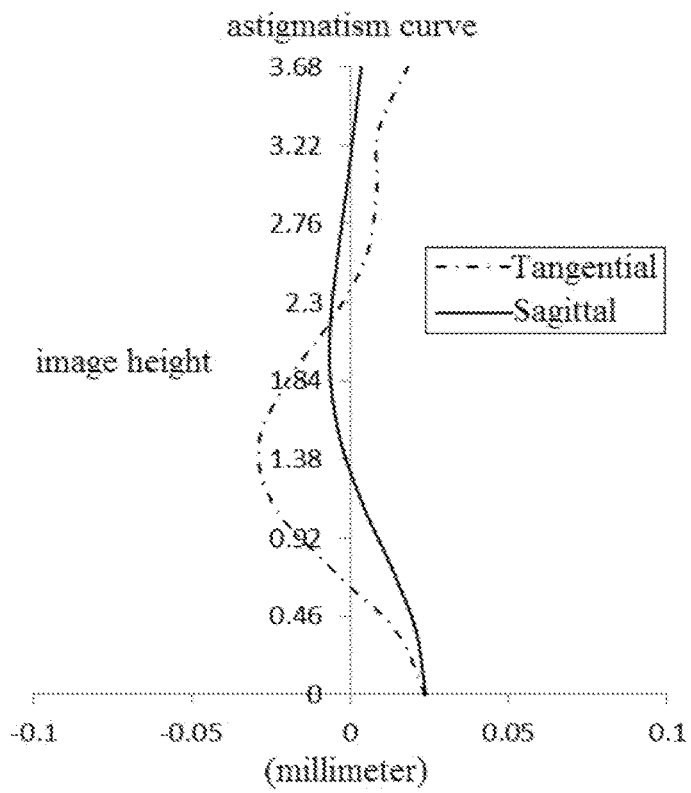
Figure 48:
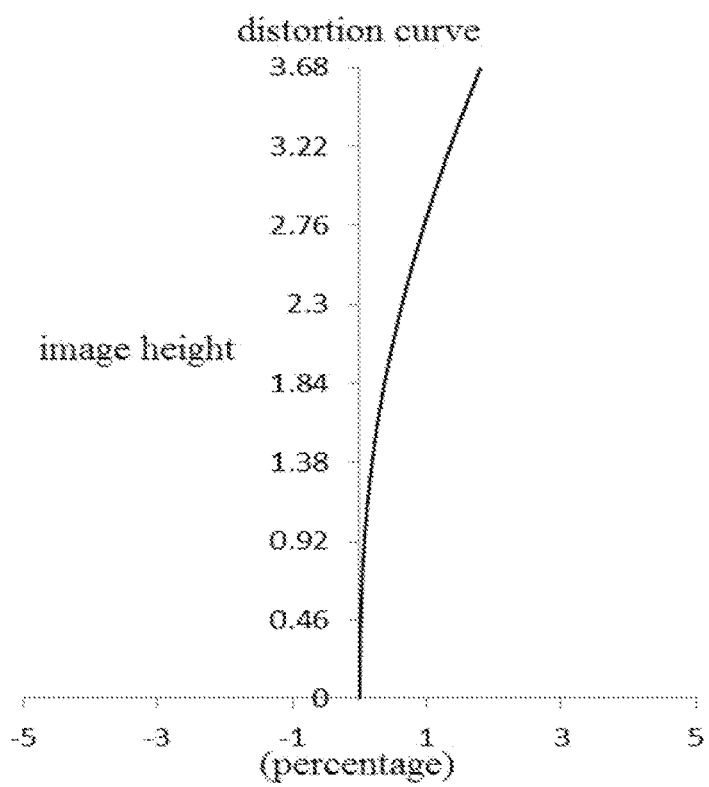

FIG. 46 shows a longitudinal aberration curve of the telephoto end of the zoom lens assembly according to Example 4 to represent deviations of a convergence focal point after light of different wavelengths passes through the zoom lens assembly. FIG. 47 shows an astigmatism curve of the telephoto end of the zoom lens assembly according to Example 4 to represent a tangential image surface curvature and a sagittal image surface curvature. FIG. 48 shows a distortion curve of the telephoto end of the zoom lens assembly according to Example 4 to represent distortion values corresponding to different fields of view.

According to FIGS. 40-48, it can be seen that the zoom lens assembly provided in Example 4 may achieve high imaging quality.

From the above, Example 1 to Example 4 meet relationships shown in Table 13 respectively.

TABLE 13

| Conditional expression | example | | | |
|---|---|---|---|---|
| | 1 | 2 | 3 | 4 |
| EPD*IMH/Dtmax | 6.86 | 6.70 | 6.76 | 6.78 |
| fw/fG1 | −0.24 | −0.29 | −0.27 | −0.28 |
| fw/fG3 | −1.18 | −1.19 | −1.15 | −1.09 |
| fG3/fG2 | −1.13 | −1.11 | −1.16 | −1.21 |
| D2/(D1 + D3) | 1.06 | 0.96 | 1.08 | 0.97 |

TABLE 13-continued

| Conditional expression | example | | | |
|---|---|---|---|---|
| | 1 | 2 | 3 | 4 |
| fG2/ΔT1 | 2.35 | 2.41 | 2.44 | 2.53 |
| fG3/ΔT3 | −1.47 | −1.50 | −1.53 | −1.59 |
| Δ|T3|/ΔT1 | 1.81 | 1.79 | 1.84 | 1.92 |
| TTL/ft | 0.92 | 0.94 | 0.91 | 0.92 |
| ft/fw | 1.74 | 1.77 | 1.74 | 1.74 |
| fw/f3 | 1.42 | 1.18 | 1.42 | 1.42 |
| fw/f7 | −1.59 | −1.63 | −1.61 | −1.46 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned zoom lens assembly.

It is apparent that the described embodiments are not all but only part of embodiments of the disclosure. All other embodiments obtained by those of ordinary skill in the art based on the embodiments in the disclosure without creative work shall fall within the scope of protection of the disclosure.

It is to be noted that terms used herein are only adopted to describe specific implementation modes and not intended to limit exemplary implementation modes according to the disclosure. For example, singular forms, used herein, are also intended to include plural forms, unless otherwise clearly pointed out. In addition, it is also to be understood that terms "contain" and/or "include" used in the specification refer/refers to existence of features, steps, work, apparatuses, components and/or combinations thereof.

It is to be noted that terms "first", "second" and the like in the specification, claims and drawings of the present disclosure are adopted not to describe a specific sequence or order but to distinguish similar objects. It is to be understood that data used like this may be exchanged under a proper condition for implementation of the implementation modes, described herein, of the present disclosure in sequences besides those shown or described here.

The above is only the preferred embodiment of the disclosure and not intended to limit the disclosure. For those skilled in the art, the disclosure may have various modifications and variations.

Any modifications, equivalent replacements, improvements and the like made within the spirit and principle of the disclosure shall fall within the scope of protection of the disclosure.

What is claimed is:

1. A zoom lens assembly, sequentially comprising, from an object side to an image side along an optical axis thereof:
   a first lens group, two lenses in the first lens group being spaced, wherein the first lens group is fixed;
   a second lens group with a positive refractive power, three lenses in the second lens group being spaced; and
   a third lens group with a negative refractive power, two lenses in the third lens group being spaced, wherein the second lens group and the third lens group move along the optical axis to implement continuous zooming;
   wherein the zoom lens assembly has a wide-angle end position, a middle end position and a telephoto end position; and
   EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, the EPD and the ImgH and the DTmax satisfy: EPD*ImgH/DTmax>6.5 mm; and
   in the wide-angle end position, the middle end position and the telephoto end position, the difference of the EPD is less than 0.1;
   the first lens group comprises a first lens and a second lens; the second lens group comprises a third lens, a fourth lens and a fifth lens; the third lens group comprises a sixth lens and a seventh lens;
   the zoom lens assembly comprises a diaphragm, the diaphragm is arranged between the first lens group and the second lens group;
   TTL is a total optical length of the zoom lens assembly, and the TTL and an effective focal length ft of the zoom lens assembly at the telephoto end position satisfy: TTL/ft≤0.95.

2. The zoom lens assembly according to claim 1, wherein an effective focal length fw of the zoom lens assembly at the wide-angle end position and an effective focal length fG1 of the first lens group satisfy: −0.5<fw/fG1<0.

3. The zoom lens assembly according to claim 1, wherein an effective focal length fw of the zoom lens assembly at the wide-angle end position and an effective focal length fG3 of the third lens group satisfy: −1.5<fw/fG3≤−1.0.

4. The zoom lens assembly according to claim 1, wherein an effective focal length fG2 of the second lens group and an effective focal length fG3 of the third lens group satisfy: −1.5<fG3/fG2<−1.0.

5. The zoom lens assembly according to claim 1, wherein a center thickness D1 of the first lens group, a center thickness D2 of the second lens group and a center thickness D3 of the third lens group satisfy: 0.9<D2/(D1+D3)<1.1.

6. The zoom lens assembly according to claim 1, wherein ΔT1 is a zooming movement distance of the second lens group from the wide-angle end position to the telephoto end position on the optical axis, and an effective focal length fG2 of the second lens group and the ΔT1 satisfy: 2.0<fG2/|ΔT1|≤2.6.

7. The zoom lens assembly according to claim 1, wherein ΔT3 is a zooming movement distance of the third lens group from the wide-angle end position to the telephoto end position on the optical axis, ΔT1 is a zooming movement distance of the second lens group from the wide-angle end position to the telephoto end position on the optical axis, and the ΔT3 and the ΔT1 satisfy: 1.5<|ΔT3|/|ΔT1|≤2.0.

8. The zoom lens assembly according to claim 1, wherein Fno is a numerical aperture of the zoom lens assembly in different zoom states, and the Fno satisfies: 2.4≤Fno<4.5.

9. The zoom lens assembly according to claim 1, wherein an effective focal length fw of the zoom lens assembly at the wide-angle end position and an effective focal length ft of the zoom lens assembly at the telephoto end position satisfy: 1.5<ft/fw<2.0.

10. The zoom lens assembly according to claim 1, wherein one of the third lens, the fourth lens and the fifth lens is a glass lens.

11. The zoom lens assembly according to claim 10, wherein an effective focal length fw of the zoom lens assembly at the wide-angle end position and an effective focal length f3 of the third lens satisfy: 1.0<fw/f3≤1.5.

12. The zoom lens assembly according to claim 10, wherein an effective focal length fw of the zoom lens assembly at the wide-angle end position and an effective focal length f7 of the seventh lens satisfy: −2.0<fw/f7≤−1.4.

13. A zoom lens assembly, sequentially comprising, from an object side to an image side along an optical axis thereof:
   a first lens group, two lenses in the first lens group being spaced, wherein the first lens group is fixed;
   a second lens group with a positive refractive power, three lenses in the second lens group being spaced; and
   a third lens group with a negative refractive power, two lenses in the third lens group being spaced, wherein the second lens group and the third lens group move along the optical axis to implement continuous zooming;
   wherein the zoom lens assembly has a wide-angle end position, a middle end position and a telephoto end position; and
   ΔT3 is a zooming movement distance of the third lens group from the wide-angle end position to the telephoto end position on the optical axis, and an effective focal length fG3 of the third lens group and the ΔT3 satisfy: −2.0<fG3/|ΔT3|≤−1.4; and
   the first lens group comprises a first lens and a second lens; the second lens group comprises a third lens, a fourth lens and a fifth lens; the third lens group comprises a sixth lens and a seventh lens;
   EPD is an entrance pupil diameter of the zoom lens assembly, ImgH is a half of a diagonal length of an effective pixel region on an imaging surface of the zoom lens assembly, DTmax is a maximum value in effective radii of each lens in the first lens group, the second lens group and the third lens group, the EPD and the ImgH and the DTmax satisfy: EPD*ImgH/DTmax>6.5 mm;
   in the wide-angle end position, the middle end position and the telephoto end position, the difference of the EPD is less than 0.1;
   the zoom lens assembly comprises a diaphragm, the diaphragm is arranged between the first lens group and the second lens group;
   TTL is a total optical length of the zoom lens assembly, and the TTL and an effective focal length ft of the zoom lens assembly at the telephoto end position satisfy: TTL/ft≤0.95.

* * * * *